(12) United States Patent
Mei et al.

(10) Patent No.: US 10,452,712 B2
(45) Date of Patent: Oct. 22, 2019

(54) MOBILE VIDEO SEARCH

(71) Applicant: Microsoft Technology Licensing, LLC, Redmond, WA (US)

(72) Inventors: Tao Mei, Beijing (CN); Shipeng Li, Palo Alto, CA (US); Wu Liu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 295 days.

(21) Appl. No.: 15/030,815

(22) PCT Filed: Oct. 21, 2013

(86) PCT No.: PCT/CN2013/085585
§ 371 (c)(1),
(2) Date: Apr. 20, 2016

(87) PCT Pub. No.: WO2015/058332
PCT Pub. Date: Apr. 30, 2015

(65) Prior Publication Data
US 2016/0267179 A1 Sep. 15, 2016

(51) Int. Cl.
*G06F 16/00* (2019.01)
*G06F 16/732* (2019.01)
(Continued)

(52) U.S. Cl.
CPC ......... *G06F 16/7328* (2019.01); *G06F 16/71* (2019.01); *G06F 16/738* (2019.01);
(Continued)

(58) Field of Classification Search
CPC ......... G06F 17/30787; G06F 17/30825; G06F 17/30837; G06F 17/3084; G06F 17/30858;
(Continued)

(56) References Cited

U.S. PATENT DOCUMENTS

| 8,364,698 B2 | 1/2013 | Delgo et al. |
| 8,515,933 B2 | 8/2013 | Tu et al. |

(Continued)

FOREIGN PATENT DOCUMENTS

| CN | 1445696 A | 10/2003 |
| CN | 101158967 A | 4/2008 |

(Continued)

OTHER PUBLICATIONS

Supplementary European Search Report dated Aug. 11, 2016 for European patent application No. 13895989.5, 4 pages.
(Continued)

*Primary Examiner* — Vincent F Boccio
(74) *Attorney, Agent, or Firm* — Schwegman Lundberg & Woessner, P.A.

(57) ABSTRACT

A facility for using a mobile device to search video content takes advantage of computing capacity on the mobile device to capture input through a camera and/or a microphone, extract an audio-video signature of the input in real time, and to perform progressive search. By extracting a joint audio-video signature from the input in real time as the input is received and sending the signature to the cloud to search similar video content through the layered audio-video indexing, the facility can provide progressive results of candidate videos for progressive signature captures.

20 Claims, 11 Drawing Sheets

(51) Int. Cl.
| | |
|---|---|
| *G06F 16/71* | (2019.01) |
| *G06F 16/738* | (2019.01) |
| *G06F 16/783* | (2019.01) |
| *G06K 9/00* | (2006.01) |
| *G06K 9/46* | (2006.01) |

(52) U.S. Cl.
CPC ..... *G06F 16/7834* (2019.01); *G06K 9/00744* (2013.01); *G06K 9/4671* (2013.01); *G06K 9/00758* (2013.01)

(58) Field of Classification Search
CPC .... G06F 16/7328; G06F 16/71; G06F 16/738; G06F 16/7834; G06K 9/00744; G06K 9/4671; G06K 9/00758
USPC ........................................................ 707/722
See application file for complete search history.

(56) References Cited

U.S. PATENT DOCUMENTS

| | | | |
|---|---|---|---|
| 2006/0253491 | A1* | 11/2006 | Gokturk ............ G06F 17/30256 |
| 2008/0222527 | A1 | 9/2008 | Kang et al. |
| 2010/0169292 | A1 | 7/2010 | Radhakrishnan et al. |
| 2010/0318515 | A1 | 12/2010 | Ramanathan et al. |
| 2011/0264700 | A1 | 10/2011 | Mei et al. |
| 2011/0311095 | A1 | 12/2011 | Archer |
| 2012/0008821 | A1 | 1/2012 | Sharon et al. |
| 2012/0117051 | A1 | 5/2012 | Liu et al. |
| 2012/0201472 | A1 | 8/2012 | Blanchflower et al. |
| 2012/0207387 | A1 | 8/2012 | Pereira et al. |
| 2013/0014136 | A1* | 1/2013 | Bhatia .................. H04N 21/252 725/9 |
| 2013/0173635 | A1 | 7/2013 | Sanjeev |
| 2013/0191368 | A1 | 7/2013 | Raichelgauz et al. |
| 2013/0246457 | A1 | 9/2013 | Stojancic et al. |
| 2015/0016661 | A1* | 1/2015 | Lord ............... H04N 21/42203 382/100 |
| 2017/0318347 | A1* | 11/2017 | Abecassis .......... H04N 21/4884 |
| 2018/0139482 | A1* | 5/2018 | Bhatia .................. H04N 21/252 |

FOREIGN PATENT DOCUMENTS

| | | |
|---|---|---|
| CN | 100538701 | 9/2009 |
| CN | 101548294 A | 9/2009 |
| CN | 102402593 A | 4/2012 |
| CN | 102591905 A | 7/2012 |
| CN | 102682091 A | 9/2012 |
| CN | 102763123 A | 10/2012 |
| CN | 102884538 A | 1/2013 |
| EP | 2388721 | 11/2011 |
| JP | 2006101166 A | 4/2006 |
| RU | 2452001 C1 | 5/2012 |
| RU | 2459281 C1 | 8/2012 |

OTHER PUBLICATIONS

Bay et al., "Speeded-Up Robust Features (SURF)", In Book of Computer Vision and Image Understanding, vol. 110, Issue 3, Jun. 2008, 14 pages.
Chandrasekhar et al., "CHoG: Compressed Histogram of Gradients a Low Bit-Rate Feature Descriptor", In IEEE Conference on Computer Vision and Pattern Recognition, Jun. 20, 2009, 8 pages.
Chen et al., "Dynamic Selection of a Feature-Rich Query Frame for Mobile Video Retrieval", In 17th IEEE International Conference on Image Processing, Sep. 26, 2010, 4 pages.
Cho et al., "Efficient Motion-Vector-Based Video Search Using Query by Clip", In IEEE International Conference on Multimedia and Expo, vol. 2, Jun. 30, 2004, 4 pages.
Girod et al., "Mobile Visual Search", In IEEE Signal Processing Magazine, vol. 28, Issue 4, Jul. 2011, 16 pages.
"Guidelines for TRECVID 2011", retrieved on Feb. 9, 2013, at «http://www-nlpir.nist.gov/projects/tv2011/», National Institute of Standards and Technology, Jan. 4, 2011, 13 pages.
He et al., "Mobile Product Search with Bag of Hash Bits and Boundary Reranking", In IEEE Conference on Computer Vision and Pattern Recognition, Jun. 16, 2012, 8 pages.
Huber et al., "Mobile Interaction Techniques for Interrelated Videos", In Extended Abstracts on Human Factors in Computing Systems, Apr. 12, 2010, 6 pages.
"IntoNow", retrieved on Sep. 2, 2013, at «http://www.intonow.com/ci», Yahoo! Inc., 2013, 2 pages.
Ji et al., "Towards Low Bit Rate Mobile Visual Search with Multiple-Channel Coding", In Proceedings of the 19th ACM International Conference on Multimedia, Nov. 28, 2011, 10 pages.
Liu et al., "Coherent Bag-of Audio Words Model for Efficient Large-Scale Video Copy Detection", In Proceedings of the ACM International Conference on Image and Video Retrieval, Jul. 5, 2010, 8 pages.
Liu et al., "Finding Perfect Rendezvous on the Go: Accurate Mobile Visual Localization and its Applications to Routing", In Proceedings of the 20th ACM International Conference on Multimedia, Oct. 29, 2012, 10 pages.
Lv et al., "MultiProbe LSH: Efficient Indexing for HighDimensional Similarity Search", In Proceedings of the 33rd International Conference on Very large Data Bases, Sep. 23, 2007, 12 pages.
Muja et al., "Fast Approximate Nearest Neighbors with Automatic Algorithm Configuration", In Proceedings of the Fourth International Conference on Computer Vision Theory and Applications, vol. 1, Feb. 5, 2009, 10 pages.
Muja et al., "Fast Matching of Binary Features", In Proceedings of the Ninth Conference on Computer and Robot Vision, May 28, 2012, 7 pages.
Norouzi et al., "Fast Search in Hamming Space with Multi-Index Hashing", In IEEE Conference on Computer Vision and Pattern Recognition, Jun. 16, 2012, 8 pages.
Norouzi et al., "Minimal Loss Hashing for Compact Binary Codes", In Proceedings of the 28th International Conference on Machine Learning, Jun. 28, 2011, 8 pages.
Paisitkriangkrai et al., "Scalable Clip-based Near-duplicate Video Detection with Ordinal Measure", In Proceedings of the ACM International Conference on Image and Video Retrieval, Jul. 5, 2010, 8 pages.
Philbin et al., "Object Retrieval with Large Vocabularies and Fast Spatial Matching", In IEEE Conference on Computer Vision and Pattern Recognition, Jun. 17, 2007, 8 pages.
Shang et al., "Real-time Large Scale Near-duplicate Web Video Retrieval", In Proceedings of the International Conference on Multimedia, Oct. 25, 2010, 10 pages.
Shanmugam et al., "An Enhanced Content-Based Video Retrieval System Based on Query Clip", In International Journal of Research and Reviews in Applied Sciences, vol. 1, Issue 3, Dec. 2009, 18 pages.
Shen et al., "Effective and Efficient Query Processing forVideo Subsequence Identification", In IEEE Transactions on Knowledge and Data Engineering, vol. 21, Issue 3, Mar. 2009, 14 pages.
Sivic et al., "Video Google: A Text Retrieval Approach to Object Matching in Videos", In Proceedings of the Ninth IEEE International Conference on Computer Vision, vol. 2, Oct. 14, 2003, 8 pages.
Snoek et al., "Early Versus Late Fusion in Semantic Video Analysis", In Proceedings of the 13th Annual ACM International Conference on Multimedia, Nov. 6, 2005, 4 pages.
Tsend et al., "Sketch-based Image Retrieval on Mobile Devices Using Compact Hash Bits", In Proceedings of the 20th ACM International Conference on Multimedia, Oct. 29, 2012, 4 pages.
"VideoSurf Mobile App", retrieved on Sep. 9, 2013, at «http://www.videosurf.com/mobile», VideoSurf Inc., 2011, 1 page.
Wang, "An Industrial-Strength Audio Search Algorithm", In 4th International Conference on Music Information Retrieval, Oct. 27, 2003, 7 pages.
Weiss et al., "Spectral Hashing", In Proceedings of the Twenty-Second Annual Conference on Neural Information Processing Systems, Dec. 8, 2008, 8 pages.

(56) References Cited

OTHER PUBLICATIONS

Wu et al., "Local Visual Words Coding for Low Bit Rate Mobile Visual Search", In Proceedings of the 20th ACM International Conference on Multimedia, Oct. 29, 2012, 4 pages.

Wu et al., "Real-Time Near-Duplicate Elimination for Web Video Search With Content and Context", In IEEE Transactions on Multimedia, vol. 11, Issue 2, Feb. 2009, 12 pages.

Wu et al., "Scalable Mobile Video Question-Answering System with Locally Aggregated Descriptors and Random Projection", In Proceedings of the 19th ACM International Conference on Multimedia, Nov. 28, 2011, 4 pages.

Yang et al., "Accelerating SURF Detector on Mobile Devices", In Proceedings of the 20th ACM International Conference on Multimedia, Oct. 29, 2012, 10 pages.

"Communication Pursuant to Article 94(3) EPC issued in European Application Serial No. 13895989.5", dated Nov. 14, 2017, 5 Pages.

"Response filed in European Application Serial No. 13895989.5", Filed Date: Oct. 27, 2016, 10 pages.

"Written Argument and Amendment filed in Japanese Application Serial No. 2016-519808", Filed Date: Oct. 17, 2017, 11 Pages, (with English Translation).

"Office Action and Search Report Issued in Russian Patent Application No. 2016115348", dated Sep. 29, 2017, 10 Pages, (w/o English Translation).

"International Search Report & Written Opinion Issued in PCT Application No. PCT/CN2013/085585", dated Jul. 29, 2014, 13 Pages.

"Office Action Issued in Japanese Patent Application No. 2016-519808", dated Jul. 18, 2017, 6 Pages.

The PCT International Preliminary Report on Patentability dated May 6, 2016 for PCT application No. PCT/CN2013/085585, 7 pages.

European Office Action dated Sep. 23, 2016 for European Patent Application No. 13895989.5, a counterpart foreign application of U.S. Appl. No. 15/030,815, 7 pages.

"First Office Action and Search Report Issued in Chinese Patent Application No. 201380080403.5", dated Nov. 27, 2018, 15 Pages.

"Office Action Issued in European Patent Application No. 13895989.5", dated Mar. 13, 2019, 4 Pages.

"Office Action Issued in Australian Patent Application No. 2013403805", dated Apr. 29, 2019, 3 Pages.

"Second Office Action Issued in Chinese Patent Application No. 201380080403.5", dated Aug. 8, 2019, (w/ English Translation), 28 pages.

* cited by examiner

MOBILE VIDEO SEARCH

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © 2013, Microsoft Corp.

BACKGROUND

Mobile devices with access to the Internet and the World Wide Web have become increasingly common, serving as personal Internet-surfing concierges that provide users with access to ever increasing amounts of data while on the go.

Mobile devices do not currently provide a platform that is conducive for some types of searching, in particular searching video content without expending the resources to record and send the recording of the search subject as a query.

Some search applications for mobile devices support photographs taken with a camera built into the mobile device as a visual query, which is called capture-to-search. In capture-to-search, typically a picture is first snapped. Then that snapshot is submitted as the query to search for a match in various vertical domains. Other search applications support audio recorded from a microphone built into the mobile device as an audio query. For example, INTONOW allows users to record audio for use as a query. However, that sound is recorded for a period of up to, about 12 seconds. Then that sound recording is submitted as a query to search for a match in various vertical domains. This process does not work well if the recording conditions are noisy or in the case of a video without sound such that the recording is silent.

Some search engines for audio files use an even longer recording time. However, typical audio search engines do not search for audio in combination with video, and they still require that the actual recording be submitted as the query.

Yet other search applications support video images taken with a camera built into the mobile device as a visual query, which can be called video capture-to-search. VIDEOSURF is an example of video capture-to-search. In VIDEOSURF, a video image is captured for a period of at least 10 seconds and stored. A user then chooses the discriminative visual content for search, and then that video image clip is submitted as a query to search for a matching video.

Existing mobile video search applications expend significant resources to store a relatively long audio and/or video clip and to send the recorded clip to the search engine. Once the search engine receives the recorded video clip query, the search engine can perform matching based on the clip. The existing methods require a clip of fixed duration e.g., 10 or 12 seconds.

Most research related to video search on mobile devices has focused on compact descriptor design on mobile devices. The most popular way to solve this problem is compressing descriptors through the technology of image coding for near-duplicate video search, which can be classified into three categories according to the type of data modality they rely on: audio-based, video-based, and fusion-based methods. However, most existing approaches to near-duplicate video search predominantly focus on desktop scenarios where the query video is usually a subset of the original video without significant distortion rather than video captured by the mobile device. Moreover, the computational costs and compactness of descriptors are often neglected in the existing approaches because conventional approaches to duplicate video search do not take the aforementioned mobile challenges into account. Conventional approaches to duplicate video search are not suitable for mobile video search.

SUMMARY

This document describes a facility for video search on a mobile device that takes advantage of computing resources available on the mobile device to extract audio and video characteristics of video content being presented by a device other than the mobile device and to send the characteristics as a query rather than sending a recording of the video content as the query. By extracting audio and video characteristics for use as a search query, and by matching the audio and video characteristics to audio and video characteristics stored in an indexed dataset of video content, the facility provides candidate videos for each audio and video characteristic submitted including when the characteristics are extracted in in noisy, poorly lit, or inconsistent conditions. The facility provides for presentation of an indication of candidate videos while additional portions of video input are being obtained and for progressive refinement of the candidate videos to be indicated. The facility provides a listing of the candidate videos, including revising the listing of candidate videos being provided whilst additional portions of video input are being obtained until a selection is made from the candidate videos being provided or until the results list of candidate videos stabilizes, e.g., the results list of candidate videos ceases to change for a period of time and the search stops. The facility provides for a different presentation of an indication of candidate videos in response to the results list of candidate videos stabilizing, e.g., ceasing to change for a period of time. The facility also provides for presentation of an additional interface in response to selection being made from the candidate videos being provided; for example, the facility provides for a browser opening to allow a user to buy or rent the selected video, to allow the user to see additional or auxiliary information about the selected video, or to allow the user to save an indication of the video for later viewing.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The terms "techniques" for instance, may refer to method(s) and/or computer-executable instructions, module(s), algorithms, hardware logic (e.g., Field-programmable Gate Arrays (FPGAs), Application-Specific Integrated Circuits (ASICs), Application-Specific Standard Products (ASSPs), System-on-a-chip systems (SOCs), Complex Programmable Logic Devices (CPLDs)), and/or "facility," for instance, may refer to hardware logic (e.g., Field-programmable Gate Arrays (FPGAs), Application-Specific Integrated Circuits (ASICs), Application-Specific Standard Products (ASSPs), System-on-a-chip systems (SOCs), Complex Programmable Logic Devices (CPLDs)), other device(s), and/or other system(s) as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
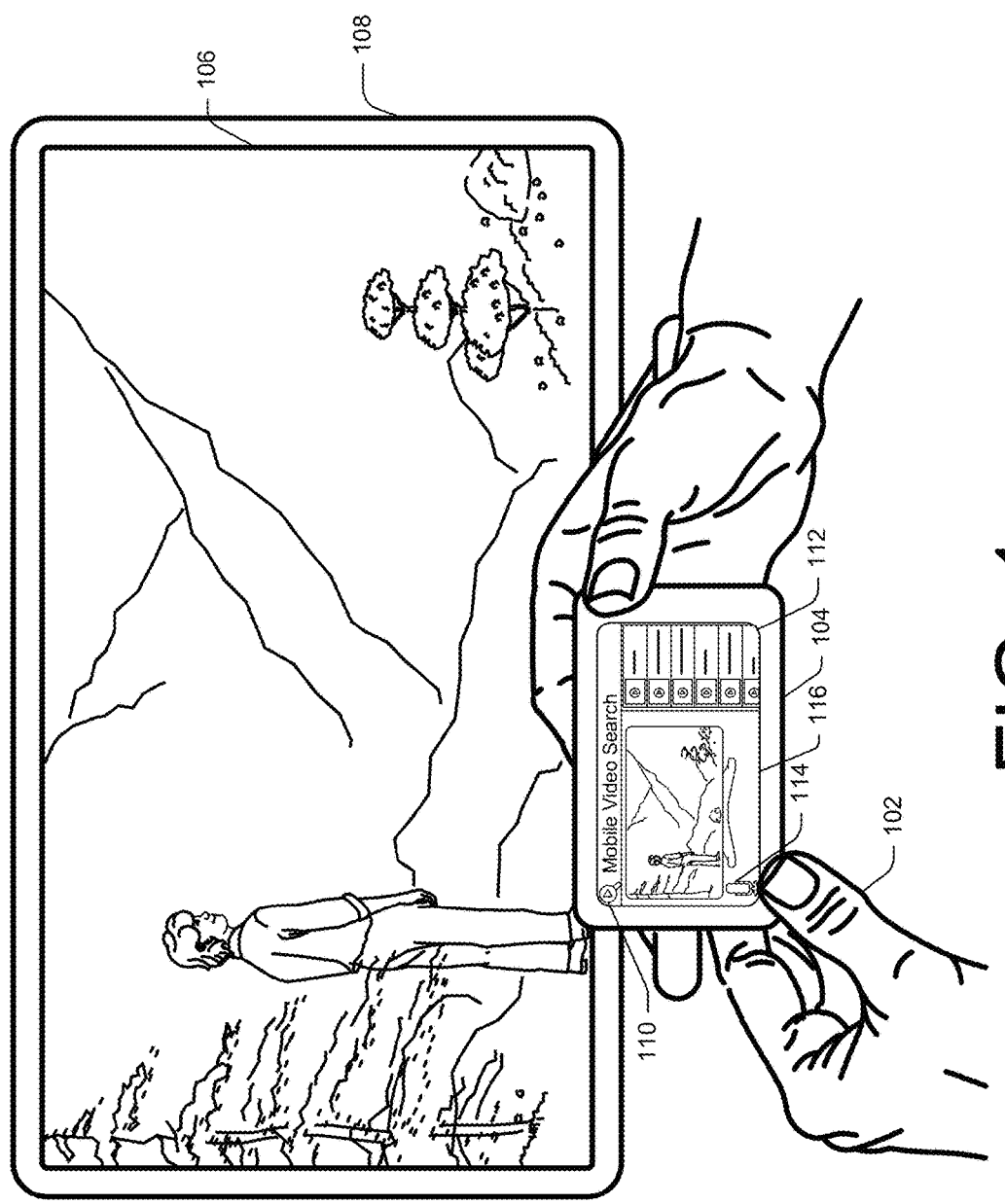
FIG. 1 is a pictorial diagram of an example implementation of mobile video search using a mobile device capturing audio-video from a video presentation on a television.

A mobile video search tool provides a rich set of functionalities to obtain relevant results for video search. Compared to a desktop computer, which predominantly supports search employing snippets of actual video files, a mobile device provides a rich set of interfaces for user interaction that can be employed to ease use and obtain results in a variety of environments. For example, beyond file upload and download and traditional keyboard and mouse inputs received in the desktop environment, mobile devices are enabled to receive additional multi-modal inputs. Mobile device interfaces can combine visual modality via a built-in camera and audio modality via a built in microphone.

While mobile devices can combine such input modalities, video search from mobile devices faces a variety of challenges. For example, one of the challenges faced by mobile video search is that a search may be desired although the user is less than ideal conditions. The environment may be noisy, inconsistently lit or with fluctuating lighting, and/or in an environment with fluctuating speeds of internet connection. In contrast, video search from desktop computers typically includes submitting a snippet of the video file rather than a recording of a presentation of the video on another device as captured with a camera and/or microphone.

Other challenges faced by mobile video search include hardware limitations of mobile devices. The processor, e.g., Central Processing Unit (CPU) and Graphics Processing Unit (GPU) and the memory of mobile devices are still not comparable with desktop computers. Stringent memory and computation constraints make signatures with large memory costs or heavy computation unsuitable for mobile clients. Additionally, the negative effects of network and bandwidth limitations. With mobile devices network connection is often unreliable and bandwidth is relatively low. In mobile video search as described herein, the effects of bottlenecks and dropped connections can be limited by using compact signatures to reduce the volume of data communicated over the network and ultimately to reduce network latency. In addition, users of mobile devices for search are sensitive to search latency. Presentation of preliminary results, including results from progressive search, while a shorter than conventional query clip is being captured reduces apparent latency for the user.

For example, a user may be walking to a meeting and notice a video presentation in a storefront window. Even though the user does not have time to stop and watch the video, the user may capture a few seconds of the video using the tool until the tool returns a matching video. The user may save the name of the video for later viewing. In this example, a client-side tool that can capture audio from the presentation and video images from the presentation and perform lightweight transformation on the captured content. The transformation includes extracting an audio fingerprint and extracting visual hash bits even in noisy street conditions. In view of the relatively limited memory and computing resources of a mobile device compared to a desktop computer, for example, can make it infeasible to extract computationally expensive signatures to present the video clip. Moreover, the bandwidth available to send the video clip to a server for processing may not be available or duration of transmission may be unacceptably long. By employing the computing capacity on the mobile device, the tool can perform the transformation and transmit a much lower amount of data over the network. For example, the extraction of an audio fingerprint may result in approximately 0.5 KB of data for a second of video. Similarly, the extraction of visual hash bits from the video may result in approximately 1.0 KB of data for a second of video. Thus, an audio-video signature of these combined characteristics can be sent for less than 2 KB of data compared to the amount of data to send the entire second of video clip. Moreover, because of the decreased latency of the retrieval system, possible matches can be returned while the video input is still being obtained, such as for progressive presentation of candidate results. When no additional candidate video matches are being obtained or the results list does not change for a period of time, e.g., 3 seconds, then the search can cease as a video matching the query has been identified, the search can automatically stop, and the user interface can be changed to reflect the stabilized list of candidate results.

Aspects of a mobile video search tool as described herein can be implemented as a search application running on the mobile device and/or via an application programming interface (API). The mobile video search tool can capture the video input for query and perform extraction of the audio fingerprint and visual hash bits to form the audio-video signature. In the case of an application running on the mobile device, the application can send the audio-video signature as the video search query. In the case of an API, the application can expose the audio fingerprint and visual hash bits making up the audio-video signature via an API for another application to use for video search.

In the cloud, the system is able to index large-scale video data using a novel Layered Audio-VidEo (LAVE) indexing scheme; while on the client, the system extracts light-weight joint audio-video signatures in real time and searches in a progressive way. The LAVE scheme combines audio-video signatures through joint multi-layered audio-video indexing, which preserves each signature's individual structure in the similarity computation and considers their correlation in the combination stage. The joint audio-video signature is computationally cheap for mobile devices and reinforces the discriminative power from the individual audio and visual modalities. Thus the audio-video signature is robust to large variances, e.g., noise and distortion in the query video. In various embodiments, a learned hash function significantly reduces the number of bits to transfer from the mobile device over a network such as to a server or the cloud. A two-part graph transformation and matching algorithm makes the video search progressive, which means the search can stop when a stable result is achieved. As described herein a result is stable when the results do not change for a period of time, e.g., for three seconds. In at least one implementation, the system described herein achieved more than 90%, e.g., 90.77%, precision when the query video was less than 10 seconds and about 70%, e.g., 70.07%, precision when the query video was less than 5 seconds.

As described herein a server or cloud computing environment, which may also be referred to as a network-distributed environment, can host a layered audio-video index of video content upon which the search is run. Similar to the description of acquisition of audio fingerprint and visual hash bits to obtain an audio-video signature, the server or cloud computer can perform extraction of audio-video signatures on video files from a library of video files. The extracted audio-video signature can be stored as a layered audio-video index, which can reduce search latency compared to other search structures.

In various embodiments, searching the LAVE Index includes a multi-step process. In at least one embodiment first, the video search engine uses the audio fingerprint from the query as a filter. Second, the video search engine compares key frames from the filtered set for similarity. Third, the video search engine performs geometric verification to obtain the closest results. The video search engine may rank the closest results, and the video search engine may update the closest results and/or the ranking as additional audio-video signatures are run from the query. The video search engine can send representations of the candidate result videos toward the mobile device from which the query originated. In some embodiments, the candidate results may be presented in a user interface shared with the audio-video capture presentation while it is ongoing. In at least one embodiment, the candidate results can be presented progressively in the user interface shared with the audio-video capture presentation while capture of the video input for query and extraction of the audio fingerprint and visual hash bits to form the audio-video signature are occurring. In the event the results list stabilizes, the capture aspect can end and the user interface can transition to a presentation of a search result list of the stable listing of candidate results with or without additional information.

In at least one embodiment, the mobile video search techniques described herein are implemented in a network-distributed environment. The network-distributed environment may include one or more types of computing resources, which types of computing resources may include computing, networking and/or storage devices. A network-distributed environment may also be referred to as a cloud-computing environment.

Aspects of various embodiments are described further with reference to FIGS. 1-11.

Example Implementation

FIG. 1 shows an implementation of an example embodiment of mobile video search using a mobile device as described herein. In the illustrated example, a user 102 is using a mobile computing device 104 such as a tablet or smartphone. In FIG. 1, the mobile computing device 104 is shown with a user interface representative of capturing audio and visual input from a video presentation 106 on a television 108 via a mobile video search tool 110 while presenting a list of candidate results 112. In at least one embodiment, the list of candidate results 112 can be calculated in real-time, or near-real, and returned to the client as a progressive list of candidate results 112. Candidate images and/or candidate text associated with candidate results can be presented in listing 112 in a user interface on the screen of mobile device 104. In the illustrated example, mobile device 104 represents a Windows Phone® device, although other mobile phones, smart phones, tablet computers, and other such mobile devices may similarly be employed. On mobile device 104, activation of a hard or soft button can indicate a desire to initiate mobile video search tool 110.

In the example implementation of FIG. 1, mobile video search tool 110 is shown capturing audio input via a microphone of the mobile device, as represented by the microphone graphic 114. Although in other implementations, audio capture may be represented by a different graphic or simply understood without a corresponding graphic. Meanwhile, mobile video search tool 110 is capturing video input via a camera of the mobile device, as is apparent from the user interface displaying the visual capture 116. While the mobile video search tool continues to capture audio input and visual input, the mobile video search tool can extract an audio fingerprint of the audio input and visual hash bits of the visual input to send toward the cloud for use in searching, for example to search a LAVE indexed dataset. In addition, while the mobile video search tool continues to capture audio input and visual input, the mobile video search tool can receive a progressive list of candidate search results 112. Candidate images and/or candidate text associated with candidate results can be presented in listing 112 in a user interface on the screen of mobile device 104. In the illustrated embodiment, a progressive list of candidate search results 112 including candidate images and candidate text is presented beside the visual capture in the user interface, although other presentation locations are contemplated.

In various embodiments, to optimize memory, the mobile device 104 does not store the audio input or visual input, and instead the mobile device 104 stores the audio fingerprint and the visual hash bits. Storing the audio fingerprint and visual hash bits can be useful for low or inconsistent bandwidth conditions, or times when the device lacks a network connection.

Previously, global features have been adopted for searching near-duplicate videos, where videos are represented by compact global signatures. Such global features have included a spatiotemporal feature that leverages gray-level intensity distribution with respect to timeline to represent videos and a combination of spatial and temporal information to construct invariant global signatures. Although these global representations achieve fast retrieval speeds in a large-scale video dataset, they do not accommodate recorded query videos with serious distortions.

Compared with global features, local descriptors are more distinctive and robust to recorded query video distortions as they explore the local invariance, such as scale and orientation. However, due to the computational complexity, efficiency of employing local descriptors for recorded query videos that may contain distortions becomes intractable. Several approaches have attempted to improve the speed of local descriptor matching including Bag-of-Words (BoW) and construction of a hierarchy structure to speed up the matching process. However, local descriptor based approaches require extensive optimization to operate on mobile devices due to the limited computing capability and memory of mobile devices.

Audio can play an important role in near-duplicate video searching. One example employs a landmark-based audio fingerprint to conduct a similar audio search, and another example includes a bag of audio words (BoA) representation, inspired by BoW, to characterize audio features for similar video search. Compared to visual features, audio features can be more robust, computationally efficient, and compact, which makes audio features suitable to employ in mobile video search.

Recently, joint audio-visual near-duplicate video search has been applied for large-scale video copy detection. The key problem of feature combination is the identification of the correlation between audio and video features. Existing fusion strategies include early fusion and late fusion. Both early fusion and late fusion strategies have disadvantages. For example, early fusion does not preserve structural information of individual features while late fusion does not recognize correlation among features.

Existing early fusion and late fusion methods cannot sufficiently mine the advantage of audio-video signatures such that existing near-duplicate video search methods can be directly adapted for mobile video search to deal with unique mobile challenges.

Figure 2:
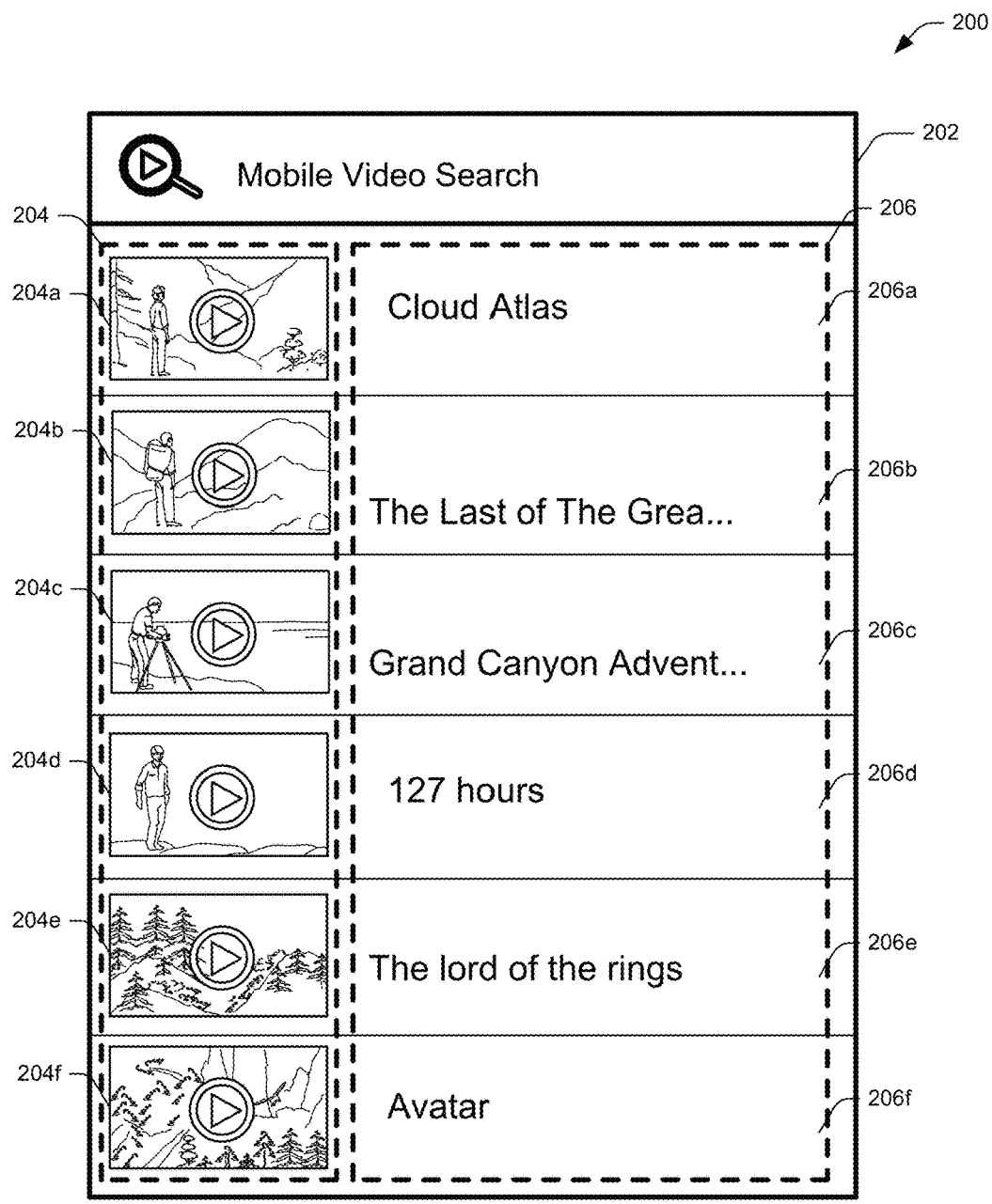
FIG. 2 is a pictorial diagram of part of an example user interface of mobile video search from the embodiment of FIG. 1.

FIG. 2 is a pictorial diagram of the example stabilized results listing 200 in the user interface of mobile video search of the embodiment of FIG. 1.

Compared to the above methods, mobile video search techniques and facility as described herein provide progressive mobile video search while video input is being captured. The mobile video search scheme progressively transmits compact audio-video signatures which can be derived from audio fingerprints and visual hash bits, to the cloud. The LAVE indexing technique exploits the advantage of the audio-video signature for robust video search. Moreover, to improve users' search experience, a progressive query process employs a two-part graph-based transformation and matching method.

Accordingly, in various implementations the mobile video search tool leverages audio input to help users accelerate a query by employing Landmark-Based Audio Fingerprinting (LBAF) to obtain audio fingerprints.

In an example implementation, candidate images associated with stabilized candidate results can be presented in a listing 200 in a user interface on the screen of mobile device 104 as shown at 204. Meanwhile, text associated with candidate results, e.g., titles, character names, etc., are presented in a listing 200 in a user interface on the screen of mobile device 104 as shown at 206. In the example shown, a results listing includes candidate images 204 and corresponding titles 206 presented in a horizontal ribbon format, from which a particular candidate result can be selected by dragging onto a search area 202 or by touching or otherwise selecting either the image or text on the screen of mobile device 104. However, other formats are both possible and contemplated. For example, selection of a candidate image can cause a browser to open and provide an opportunity for a user to buy or rent a copy of the selection for viewing on the mobile device and/or selection of a text or title can bring up information about the associated video or store the title, with or without the associated image, for later access.

Illustrative Architecture

Figure 3:
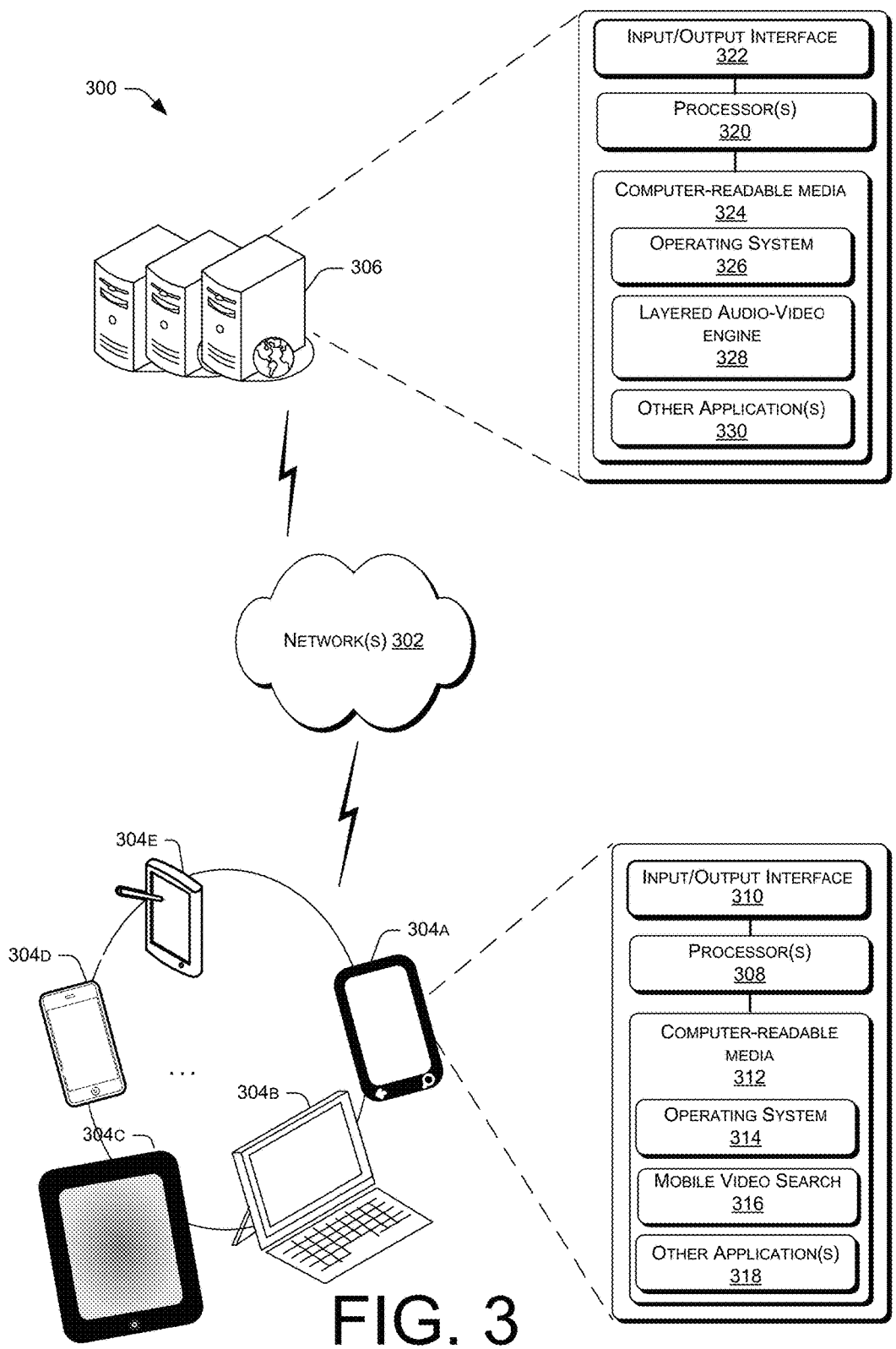
FIG. 3 is a pictorial diagram of an example architecture for implementing mobile video search.

The architecture described below constitutes but one example and is not intended to limit the claims to any one particular architecture or operating environment. Other architectures may be used without departing from the spirit and scope of the claimed subject matter. FIG. 3 is a pictorial diagram of an example architecture for implementing mobile video search.

In some embodiments, the various devices and/or components of environment 300 include one or more network(s) 302 over which a mobile computing device 304, which can correspond to mobile computing device 104 and is also referred to herein as a client device 304 or simply a device 304, may be connected to at least one server 306. The environment 300 may include multiple networks 302, a variety of devices 304, and/or a plurality of servers 306.

In various embodiments, server(s) 306 can host a cloud-based service or a centralized service particular to an entity such as a school system or a company. Embodiments support scenarios where server(s) 306 can include one or more computing devices that operate in a cluster or other grouped configuration to share resources, balance load, increase performance, provide fail-over support or redundancy, or for other purposes over network 302.

For example, network(s) 302 can include public networks such as the Internet, private networks such as an institutional and/or personal intranet, or some combination of private and public networks. Network(s) 302 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 302 can utilize communications protocols, including packet-based and/or datagram-based protocols such as internet protocol (IP), transmission control protocol (TCP), user datagram protocol (UDP), or other types of protocols. Moreover, network(s) 302 can also include a number of devices that facilitate network communications and/or form a hardware basis for the networks, such as switches, routers, gateways, access points, firewalls, base stations, repeaters, backbone devices, and the like.

In some embodiments, network(s) 302 can further include devices that enable connection to a wireless network, such as a wireless access point (WAP). Embodiments support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

Computer Readable Media

Computer-readable media, as the term is used herein, includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium or memory technology or any other non-transmission medium that can be used to store and maintain information for access by a computing device.

In contrast, communication media may embody computer-readable instructions, data structures, program modules, or other data in a modulated data signal, such as a carrier wave, or other transmission mechanism.

As defined herein, computer storage media does not include communication media exclusive of any of the hardware components necessary to perform transmission. That is, computer storage media does not include communications media consisting solely of a modulated data signal, a carrier wave, or a propagated signal, per se.

In various embodiments, mobile computing devices 304 include devices such as devices 304A-304E. Embodiments support scenarios where device(s) 304 can include one or more computing devices that operate in a cluster or other grouped configuration to share resources or for other purposes. Although illustrated as a diverse variety of mobile device types, device(s) 304 can be other mobile device types and are not limited to the illustrated mobile device types. Device(s) 304 can include any type of mobile computing device with one or multiple processor(s) 308 operably connected to an input/output interface 310 and computer-readable media 312. Devices 304 can include mobile computing devices such as, for example, smartphones 304A, laptop computers 304B, tablet computers 304C, telecommunication devices 304D, personal digital assistants (PDAs) 304E, and/or combinations thereof. Devices 304 can also include electronic book readers, wearable computers, automotive computers, gaming devices, mobile thin clients, terminals, and/or work stations. In some embodiments, devices 304 can be other than mobile devices and can include, for example, desktop computers and/or components for integration in a computing device, appliances, or another sort of device.

In some embodiments, as shown regarding device 304A, computer-readable media 312 can store instructions executable by the processor(s) 308 including an operating system 314, an engine for mobile video search 316, and other modules, programs, or applications 318 that are loadable and executable by processor(s) 308 such as a CPU or a GPU. Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The computer-readable media 312 in various embodiments may include computer storage media, which in turn may include volatile memory, nonvolatile memory, and/or other persistent and/or auxiliary computer storage media as discussed above. Thus, computer-readable media 312 when implemented as computer storage media, includes tangible and/or physical forms of media included in a device and/or hardware component that is part of a device or external to a device, including but not limited to random access memory (RAM), static random-access memory (SRAM), dynamic random-access memory (DRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device. However, computer-readable media 312 when implemented as computer storage media does not include communications media consisting solely of propagated signals, per se.

Device(s) 304 can further include one or more input/output (I/O) interfaces 310 to allow a device 304 to communicate with other devices. Input/output (I/O) interfaces 310 of a device 304 can also include one or more network interfaces to enable communications between computing device 304 and other networked devices such as other device(s) 304 and/or server(s) 306 over network(s) 302. Input/output (I/O) interfaces 310 of a device 304 can allow a device 304 to communicate with other devices such as user input peripheral devices (e.g., a keyboard, a mouse, a pen, a game controller, an audio input device, a visual input device, a touch input device, gestural input device, and the like) and/or output peripheral devices (e.g., a display, a printer, audio speakers, a haptic output, and the like). Network interface(s) can include one or more network interface controllers (NICs) or other types of transceiver devices to send and receive communications over a network.

Server(s) 306 can include any type of computing device with one or multiple processor(s) 320 operably connected to an input/output interface 322 and computer-readable media 324. In some embodiments, as shown regarding server(s) 306, computer-readable media 324 can store instructions executable by the processor(s) 320 including an operating system 326, a framework for a layered audio-video engine 328, and other modules, programs, or applications 330 that are loadable and executable by processor(s) 320 such as a CPU and/or a GPU. Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The computer-readable media 324 when implemented as computer storage media may include volatile memory, non-volatile memory, and/or other persistent and/or auxiliary computer-readable storage media. Server(s) 306 can further include one or more input/output (I/O) interfaces 322 to allow a server 306 to communicate with other devices such as user input peripheral devices (e.g., a keyboard, a mouse, a pen, a game controller, an audio input device, a video input device, a touch input device, gestural input device, and the like) and/or output peripheral devices (e.g., a display, a printer, audio speakers, a haptic output, and the like). Input/output (I/O) interfaces 310 of a server 306 can also include one or more network interfaces to enable communications between computing server 306 and other networked devices such as other server(s) 306 or devices 304 over network(s) 302.

In various embodiments, server(s) 306 can represent a cloud based service or a centralized service particular to an entity such as a school system or a company. Server(s) 306 can include programming to send a user interface to one or more device(s) 304. Server(s) 306 can store or access a user profile, which can include information a user has consented the entity collect such as a user account number, name, location, and/or information about one or more client device(s) 304 that the user can use for sensitive transactions in untrusted environments.

Example Mobile Device

Figure 4:
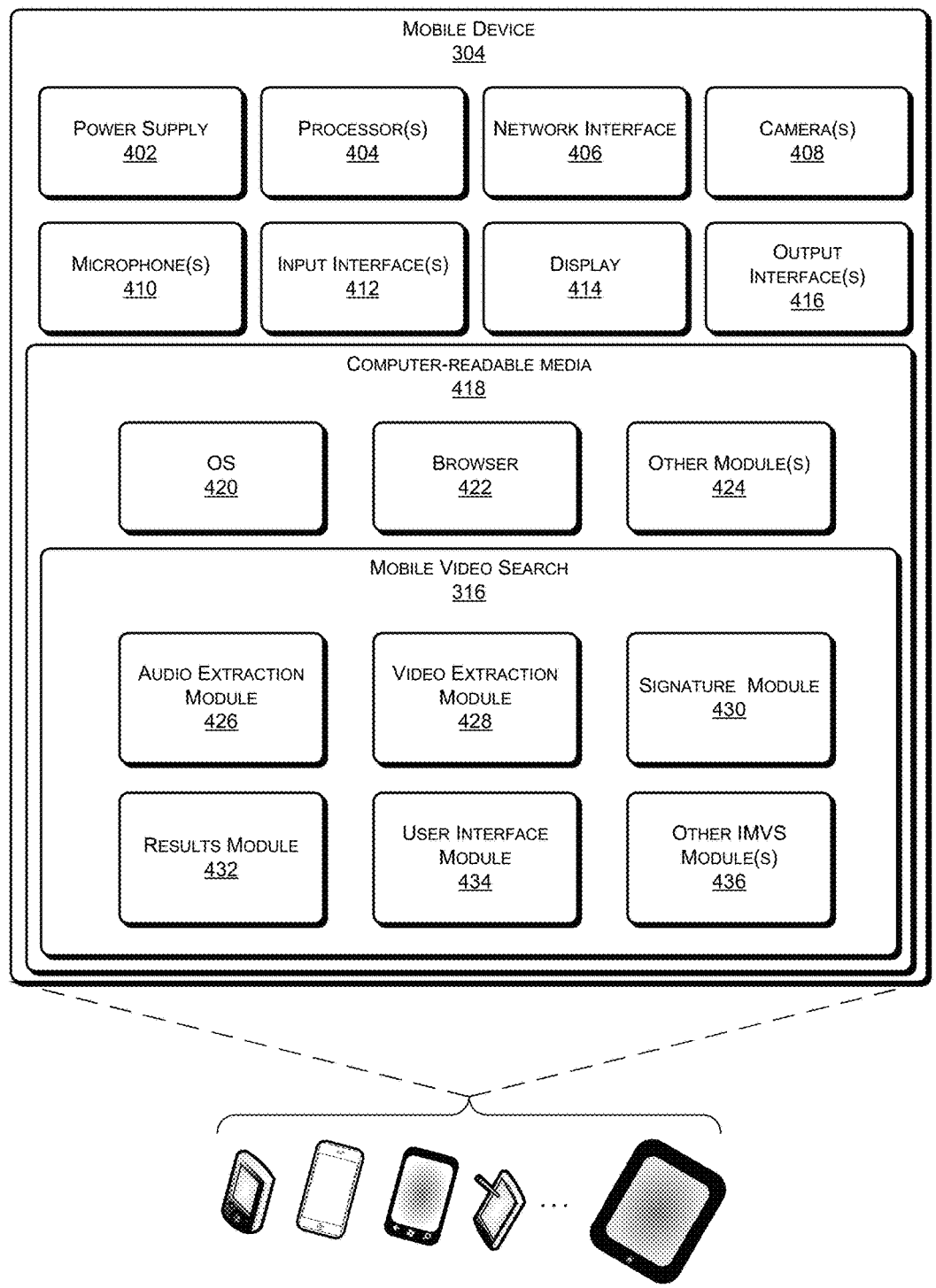
FIG. 4 is a block diagram that illustrates select components of example mobile devices configured for mobile video search.

FIG. 4 illustrates select components of an example mobile device 104 configured to provide a mobile video search facility as described herein. Example mobile device 304 includes a power supply 402, one or more processors 404, which can correspond to processor(s) 308 and can include microprocessors, and input interfaces corresponding to input/output interface 310 including a network interface 406, one or more cameras 408, one or more microphones 410, and in some instances additional input interface 412 can include a touch-based interface and/or a gesture-based interface. Example mobile device 304 also includes output interfaces corresponding to input/output interface 310 including a display 414 and in some instances may include additional output interface 416 such as speakers, a printer, etc. Network interface 406 enables mobile device 304 to send and/or receive data over network 302. Network interface 406 may also represent any combination of other communication interfaces to enable mobile device 304 to send and/or receive various types of communication, including, but not limited to, web-based data and cellular telephone network-based data. In addition example mobile device 304 includes computer-readable media 418, which in some embodiments corresponds to computer-readable media 312. Computer-readable media 418 stores an operating system (OS) 420, a browser application 422, a mobile video search tool 316, and any number of other applications or modules 424, which are stored in computer-readable media 418 as computer-readable instructions, and are executed, at least in part, on processor 404.

Browser application 422 represents any of a variety of applications that can be executed on mobile device 304 to provide a user interface through which web content available over the Internet may be accessed.

Other applications or modules 424 may include any number of other applications that are executable on the mobile device 304. Such other applications may include, for example, an email application, a calendar application, a transactions module, a music player, a camera application, a calculator, one or more games, one or more productivity tools, a messaging application, an accelerometer, and so on.

Mobile video search tool 316 includes one or more of audio extraction module 426, video extraction module 428, signature module 430, results module 432, user interface module 434, and any number of other mobile video search modules 436. Audio extraction module 426 can extract an audio fingerprint such as LBAF.

Video extraction module 428 employs a video descriptor that is robust to distortions such as motion, blur, and inconsistent lighting conditions as well as quickly extracted. Video extraction module 428 can extract raw features such as Speeded-Up Robust Features (SURF) features from local video features. However, sending raw SURF features may cause a mobile device to consume an unacceptably high amount of energy and it may take too long to be acceptable to users. In various embodiments the video extraction module uses hashing methods to compress the local features to hash bits, consistent with the light computation and memory resources of mobile computing device 104.

Signature module 430 operates consistent with, and may make up all or a part of the programming to perform a LAVE search based at least on the audio fingerprint from audio extraction module 426 and/or visual hash bits from video extraction module 428.

User interface module 434 operates consistent with, and may make up all or a part of the programming for operation of other mechanical and/or software user interface components of the mobile device 104. For example, user interface module 434, which can be executed by processor 404, can control the functions of a hard or soft selection button, a home screen button, a back button, and/or a start button in the context of the mobile video search tool 316. User interface module 434 enables presentation and selection of particular listings of the candidate results listings received by results module 432. For example, user interface module 434 provides for presentation and selection of particular candidate listings presented in a scrollable ribbon format on the screen of mobile device 104 as shown at 112 and/or 200.

In some embodiments, other interactive multi-modal image search components 436 can apply the context of other interactive data to perform a mobile video search. For example, other context data that can be used may include, but is not limited to, recent searches, messaging information, data that identifies recently accessed applications (e.g., browser search, movie listing apps, etc.), and so on.

Although illustrated in FIG. 4 as being stored on computer-readable media 418 of mobile device 304, in some implementations, mobile video search tool 316, or portions thereof, can be stored on one or more servers 306 and/or executed via a cloud based implementation. In addition, in some implementations, mobile video search tool 316, or portions thereof, can be implemented using any form of computer-readable media that is accessible by mobile device 304. Furthermore, in some embodiments, one or more components of operating system 420, browser application 422, mobile video search tool 316, and/or other applications or modules 424 may be implemented as part of an integrated circuit that is part of, or accessible to, mobile device 304. Furthermore, although illustrated and described as being implemented on a mobile device 304, in some embodiments, the data access and other functionality provided by mobile video search tool 316 as described herein may also be implemented on any other type of computing device that is configured for audio and visual input and through which a user can perform a video search, including, but not limited to, desktop computer systems, gaming systems, and/or television systems.

Example Server Device

Figure 5:
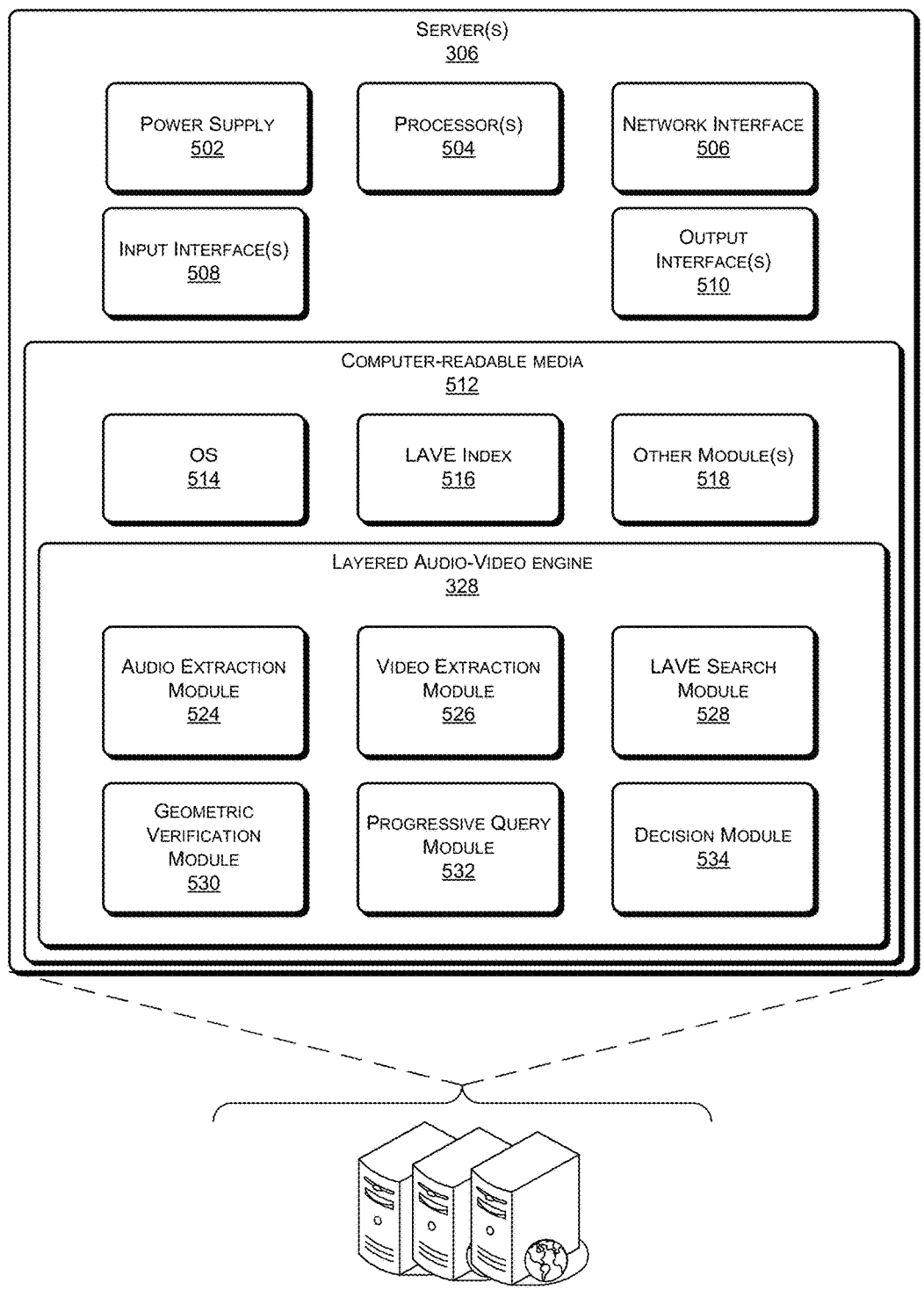
FIG. 5 is a block diagram that illustrates select components of example server devices configured for layered audio-video indexing, which can be employed for mobile video search.

FIG. 5 is a block diagram that illustrates select components of an example server device 306 configured to provide layered audio-video indexing as a mobile video search facility as described herein. Example server 306 includes a power supply 502, one or more processors 504, which can correspond to processor(s) 320 and can include microprocessors, and input interfaces corresponding to input/output interface 322 including a network interface 506, and in some instances may include one or more additional input interfaces 508 such as a keyboard, soft keys, a microphone, a camera, etc. In addition to network interface 506, example server device 306 can also include one or more additional output interfaces 510 corresponding to input/output interface 322 including output interfaces such as a display, speakers, a printer, etc. Network interface 506 enables server 306 to send and/or receive data over a network 302. Network interface 506 may also represent any combination of other communication interfaces to enable server 306 to send and/or receive various types of communication, including, but not limited to, web-based data and cellular telephone network-based data. In addition example server 306 includes computer-readable media 512, which in some embodiments corresponds to computer-readable media computer-readable media 324. Computer-readable media 512 stores an operating system (OS) 514, a LAVE index 516, a layered audio-video engine 328, and any number of other applications or modules 518, which are stored on computer-readable media 512 as computer-executable instructions, and are executed, at least in part, on processor 504.

Other applications or modules 518 may include any number of other applications that are executable on the server 306. Such other applications may include, for example, an email application, a calendar application, a transactions module, a music player, a camera application, a calculator, one or more games, one or more productivity tools, a messaging application, an accelerometer, and so on.

Layered audio-video engine 328 includes at least one of audio extraction module 524, video extraction module 526, LAVE search module 528, geometric verification module 530, progressive query module 532, and decision module 534.

Although illustrated in FIG. 5 as being stored on computer-readable media 512 of server 306, in some implementations, layered audio-video engine 328, or portions thereof, can be stored on one or more additional servers 306 and/or executed via a cloud based implementation. In addition, in some implementations, layered audio-video engine 328, or portions thereof, can be implemented using any form of computer-readable media that is accessible by server 306. Furthermore, in some embodiments, one or more components of operating system 514, LAVE index 516, and/or other applications or modules 518 may be implemented as part of an integrated circuit that is part of, or accessible to, server 306. Furthermore, although illustrated and described as being implemented on a server 306, in some embodiments, the data access and other functionality provided by layered audio-video engine 328 as described herein may also be implemented on any other type of computing device that is configured for audio and visual indexing and that can perform a video search based on video query input, including, but not limited to, desktop computer systems, head end television distribution systems, and laptop computer systems.

Figure 6:
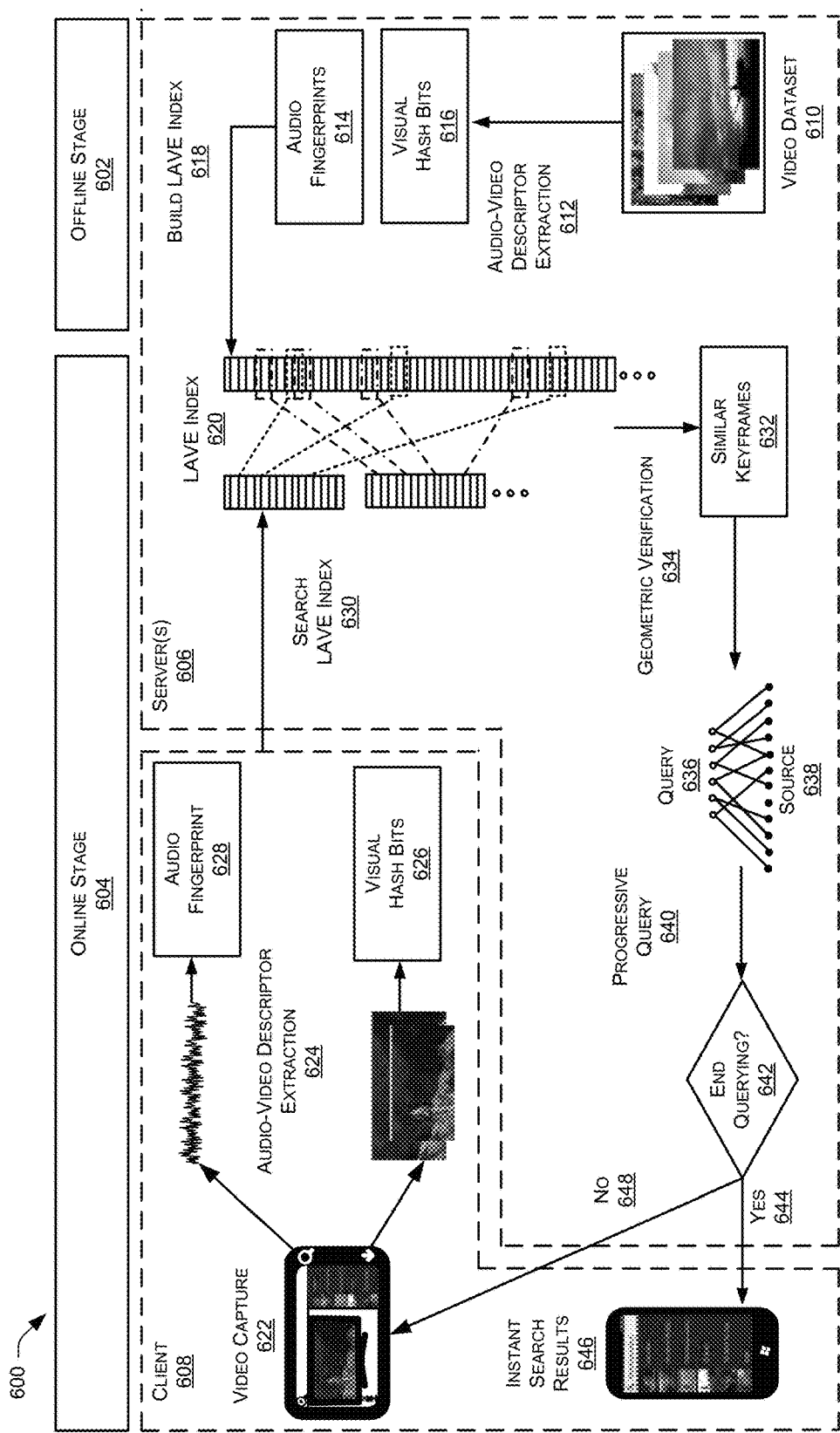
FIG. 6 is a pictorial diagram of an example framework of a system including a mobile device implementing mobile video search and a server implementing layered audio-video indexing.

FIG. 6, at 600, is a pictorial diagram of an example framework of a mobile device implementing mobile video search and a server or cloud computing environment, which may also be referred to as a network-distributed environment, implementing layered audio-video indexing. Framework 600 is illustrated with an offline stage 602 and an online stage 604. Framework 600 can include at least one server 606, which in various embodiments corresponds to server(s) 306, and may include, for example, a web server, an application server, and any number of other data servers. Meanwhile, framework 600 can include at least one client 608, which in various embodiments corresponds to device(s) 104 and/or 304.

In various embodiments, client 608 is representative of any type of mobile computing device configured to transmit and receive data over a network such as over network 302. For example, client 608 may be implemented as a mobile phone, a smartphone, a personal digital assistant (PDA), a netbook, a tablet computer, a handheld computer, and other such mobile computing devices characterized by reduced form factor and resource limitations.

In the offline stage 602, the power of cloud computing can be used to store a large-scale source video dataset 610, which may include many thousands of videos. At 612, a layered audio-video indexing application such as LAVE 328 extracts the audio-video descriptors for individual of the videos from large-scale source video dataset 610. Effective joint audio-video descriptors will be robust to the variance of query videos from complex mobile video capturing conditions (e.g., silent video or blurred video of low visual quality) in a mobile video search system. In various embodiments, joint descriptor selection is based, at least in part, on three characteristics: 1) robust to the variance of the recorded query videos, 2) cheap to compute on mobile devices, and 3) easy to index for mobile video search. In at least one embodiment, the LAVES application employs Landmark-Based Audio Fingerprinting (LBAF) to obtain audio fingerprints 614 and Speeded-Up Robust Features (SURF) to obtain visual hash bits 616. At 618 LAVE application 328 builds and stores a LAVE index 620 using these descriptors.

The online query stage 604 includes the following operations which can be performed while a client device 608, such as device 304, captures query video clips 622: 1) Real time extraction of light-weight audio-video descriptors on the mobile device 624. The mobile video search tool 316 sends the audio-video signature (including visual hash bits 626 and audio fingerprint 628) toward server 606. In various embodiments mobile video search tool 316 sends the signature at predetermined intervals, e.g., at an interval of two seconds, at an interval of one second, at an interval of one-half second, etc. 2) The server 606 receives the signature, e.g., the two-second signature, the one-second signature, the half-second signature, etc. As shown at 630, server 606 conducts the search for similar video key frames 632 through the LAVE index 620. 3) As shown at 634, server 606 uses geometric verification-based visual ranking to refine the search results. Geometric verification-compares query characteristics 636 to source characteristics 638. For each matched query, e.g., a one second query and source video key-frames, one node in a two-part graph can represent the received query and another node can represent a candidate matching key frame from the source video. In the graph, an edge connects the query node to the candidate matching key frame node. 4) As shown at 640, server 606 performs a progressive query process via two-part graph transformation and matching to make the video search progressive. The particulars of progressive query process 640 are shown in Algorithm 1. For example, if a new query arrives, a new query node will be added at 636. Then, the edges of the two-part graph will be updated according to the returned result. During progressive query 640, if the number of edges of the two-part graph does not change, a similarity score of the matched video will not change; otherwise, the similarity score of the matched video will be updated.

At 642, if there are no changes in the search results and/or the similarity score for a period of time, e.g., for a predetermined period of two consecutive seconds, for three consecutive seconds, for four consecutive seconds, the decision module 534 determines that a stable search result has been achieved. In some embodiments, at 642, if there are no changes in the search results and/or the similarity score for a period of time, e.g., for a variable period of time and/or a relative period of time, the decision module 534 determines that a stable search result has been achieved. When a stable search result is achieved, the search process can cease automatically, and at 644 the results will be returned to the mobile device. In some embodiments when the search result is stable the results are returned for presentation on client device 608 in a user interface that signals the search is stable as shown at 646. However, when the search results are not stable for the desired time, the search process continues and at 648 decision module 534 returns the results to the device 608 in a manner to indicate that the search is not complete as shown in the user interface during video capture 622.

In the illustrated example, a client device 608, such as mobile device 304 receives a video input via a microphone and camera to initiate a video query, as shown at 622. The system employs an audio extraction module such as module 426 to extract an audio fingerprint such as LBAF as shown at 628. The system also employs video extraction module such as module 428 to extract visual hash bits as shown at 626.

With regard to visual hash bits, video extraction modules such as video extraction module 428 and/or video extraction module 526 can use hashing methods to compress the local features to hash bits. For example, the video extraction module can use Minimal Loss Hashing or Spectral Hashing to learn a hash function such as that represented by $h^v = \text{sign}(v^t x - t)$ where x represents the SURF descriptor vector, v represents the learned hash matrix, and t represents the threshold scalar, to calculate $h^v$, which represents the learned visual hash bits. In some embodiments, the video extraction module can limit the binary code to 80 bits. In such embodiments, the video extraction module can use eight bits to save the angle value of the SURF descriptor, which will be used for geometric verification in the future as discussed regarding 634 of FIG. 6. Therefore, the video extraction module can compress each SURF feature to $v_i = \{h_i^v, r_i^v\}$, which in the discussed example can be just 88 bits.

The video extraction module can scale the query image to a small picture to minimize differences due to different camera resolutions on various mobile devices. Scaling the query image to a small picture can improve feature extraction speed on the mobile device and it can decrease the number of feature points that need to be transmitted. In several implementations, such scaling improves query speed with little influence on precision. For example, after the scaling, there is an average of 75 SURF points for one frame, which allows the mobile device to transmit less than 1 KB of visual features to the server for the frame.

Figure 7:
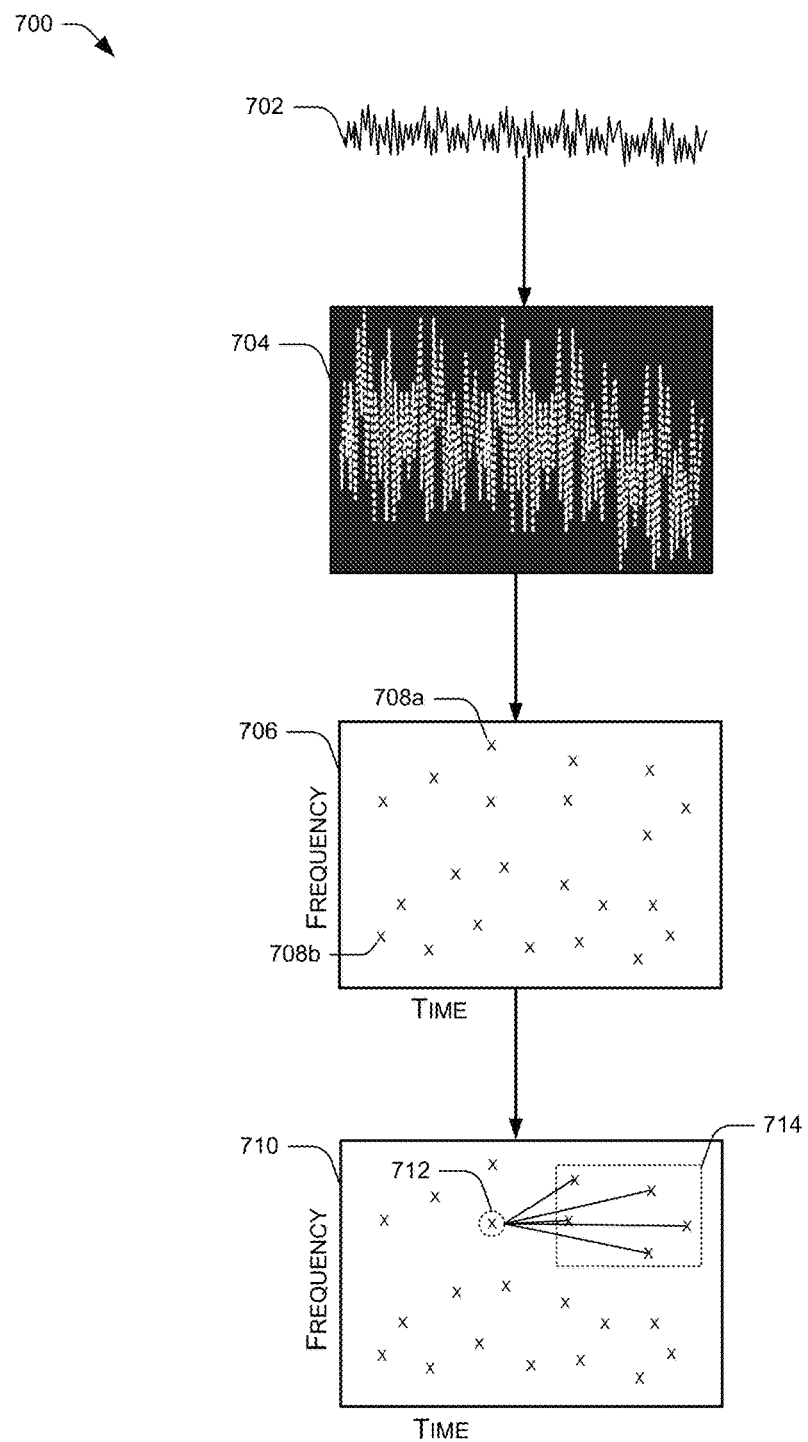
FIG. 7 is a pictorial diagram of an example of extraction of an audio fingerprint.

FIG. 7 is a pictorial diagram of an example of extraction of an audio fingerprint. Among various audio features, LBAF is widely used in many near-duplicate video search methods. Its fast computation, efficient memory and invariant translation are also suitable for mobile video search. In various implementations, an audio extraction module such as audio extraction module 426 and/or audio extraction module 524 extracts an audio fingerprint such as LBAF. At 702, the audio extraction module segments the audio information into short and partly overlapping frames of length $f_{m_l}$ and stride $f_{m_d}$. At 704, the audio extraction module calculates a spectrogram for each frame. At 706, the audio extraction module sets candidate peaks such as 708a and 708b on the spectrogram of the frame. In several embodiments the audio extraction module sets the candidate peaks on the spectrogram of the frame according to at least three criteria: higher energy content than all its neighbors, higher amplitude than its neighbors, and a density criterion. At 710, the audio extraction module chooses an anchor point 712 from the peaks and identifies a corresponding target zone 714 for the anchor point. Each anchor point 712 is sequentially paired with the candidate peak in its target zone 714. The anchor point-candidate peak pairs may be called landmarks. Each landmark can be represented as $l_i = \{t_i^a, f_i^a, \Delta t_i^a, \Delta f_i^a\}$, where $t_i^a$ and $f_i^a$ are the time offset and the frequency of the anchor point, and $\Delta t_i^a$ and $\Delta f_i^a$ are the time and frequency differences between the anchor point and the paired point in the target zone. The audio extraction module can compress the fingerprint into $l_i = \{h_k^a, t_i^a\}$ where $h_k^a$ is the hash value of the $f_i^a$, $\Delta t_i^a$ and $\Delta f_i^a$. Different $l_i$ may have the same $h_k^a$.

In one implementation, $f_{m_l} = 256$ ms and $f_{m_d} = 32$ ms, with a limit on hash bits $h_k^a$ to less than 25 bits. As there are 15 bits for $t_i^a$, the length of $l_i = 40$ bits. In at least one embodiment, for a one-second audio clip, the audio extraction module may choose 100 landmarks in total. Hence, the audio extraction module can reduce the amount of data to transmit to just 0.5 KB per second for audio fingerprinting.

In this example, through feature extraction, the mobile device obtains 100 audio feature points and 75 visual feature points, which through efficient compression represents less than 2 KB of audio-visual signatures per second of video content to be transmitted over the network.

Figure 8:
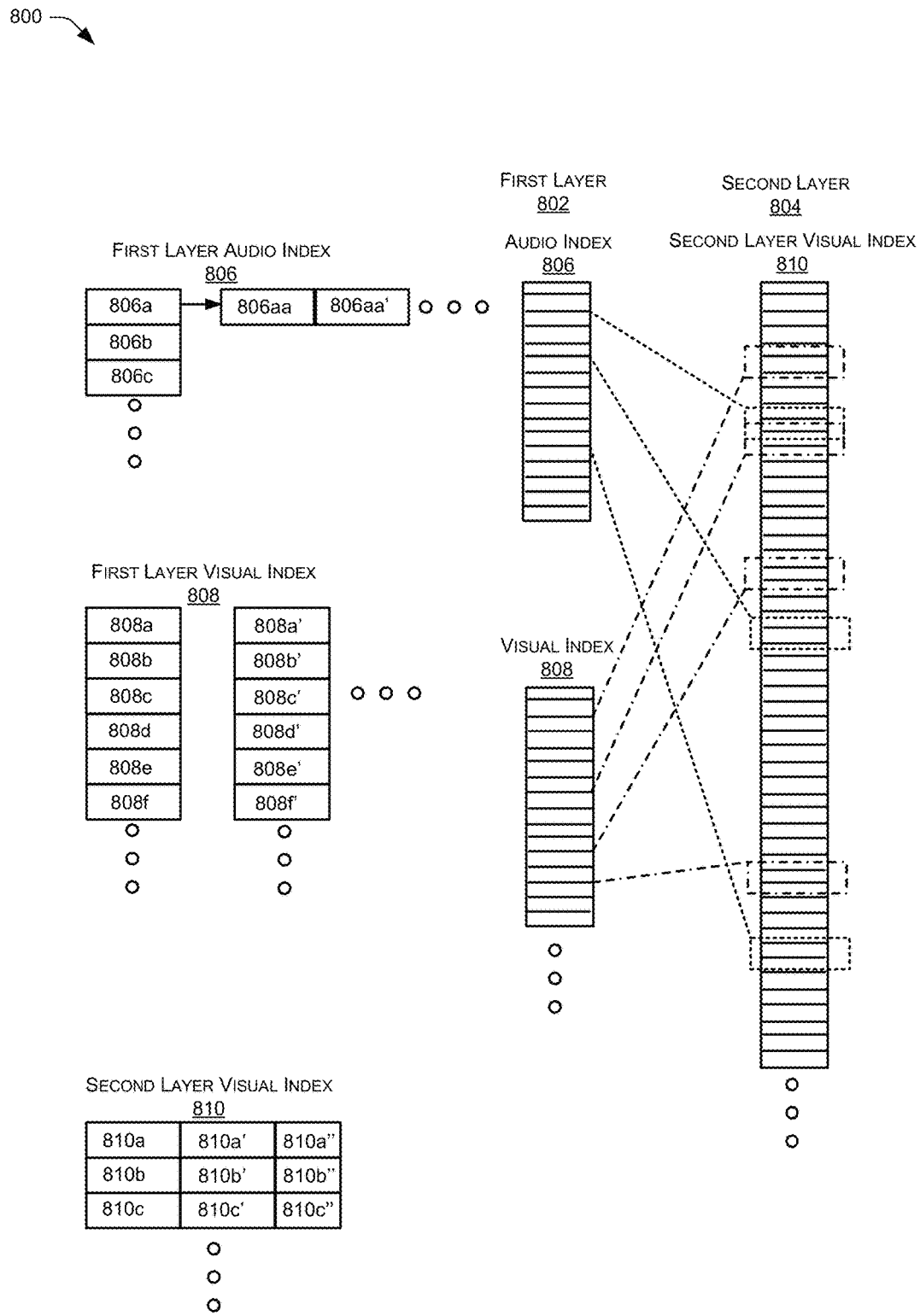
FIG. 8 is a pictorial diagram of an example of a layered audio-video index.

FIG. 8 is a pictorial diagram of an example of a layered audio-video (LAVE) indexing scheme 800. As shown at 800, the LAVE scheme employs two layers 802 and 804. The first layer 802 represents an index entry, which contains a multi-index made up of audio index 806 and visual index 808. The second layer 804 represents visual hash bits, which includes second layer visual indexing 810. The LAVE scheme uses the visual hash bits of second layer visual indexing 810 for feature matching and combination. After the searching in the first layer, the system can obtain refined similar visual feature points from the audio index and from the visual index. Accordingly, combination in this context includes fusing the refined similar visual feature points from the audio index and from the visual index together and selecting the most (top K) similar visual feature points from them.

There are two advantages to these structures: 1) the structures improve the visual points search speed by employing the hierarchical decomposition strategy, and 2) the structures exploit the complementary nature of audio and visual signals. The different indexing entries in the first layer 802 preserve the individual structure of audio and visual signatures. In the second layer 804, the combination of audio and visual can be weighted by the hamming distance of visual hash bits.

Building a LAVE Index

In various embodiments, in contrast to visual features, the audio feature can be highly compressed, for example with just 25 bits to represent each point. The compression allows, the LAVE search module 528 to conduct a linear search of the audio index. To build a LAVE index 516, a process such as that shown at 618 can use the audio index as part of the first layer 802 and each bucket, e.g., 806a, $h_k^a$, in the audio index of the first layer can be associated with the second layer by the video ID, audio time offset $t^a$ and key frame number $t^v$, e.g., 806aa, $ID_i$, $t_i^a$, and 806aa', $ID_i$, $t_i^a$, and so on 806b, e.g., $h_{k+1}^a$, 806c, e.g., $h_{k+2}^a$, etc. Through the audio indexing, the layered audio-video engine 328 can refine the number of visual points to be searched in the second layer, which improves the search speed.

However, the audio information being changed significantly or missed can make it difficult to find the closet neighbor in the second layer. Layered audio-video engine 328 uses a multi-index to solve this problem. Layered audio-video engine 328 indexes the hash bits from the second layer visual index by m different hash tables, which construct the visual index of the first layer. Layered audio-video engine 328 randomly selects the hash bits, $h_n^{sub}$ of the visual index in the first layer e.g., 808a $h_n^{sub}$, 808a' $h_{n'}^{sub}$, 808b $h_{n+1}^{sub}$, 808b' $h_{n'+1}^{sub}$, 808c $h_{n+2}^{sub}$, 808c' $h_{n'+2}^{sub}$, 808d $h_{n+3}^{sub}$, 808d' $h_{n'+3}^{sub}$, 808e $h_{n+4}^{sub}$, 808e' $h_{n'+4}^{sub}$, 808f $h_{n+5}^{sub}$, 808f' $h_{n'+5}^{sub}$, etc., from the hash bits in the second layer. For a received visual point, entries that fall close to the query in at least one such hash table are considered neighbor candidates. Layered audio-video engine 328 then checks the candidates for validity using the second layer index 810, e.g., 810a $ID_i$, $t_m^v$, 810a' $h_n^v$, 810a" $r_i^v$, 810b $ID_i$, $t_m^v$, 810b' $h_{n+1}^v$, 810a" $r_{i+1}^v$, 810c $ID_i$, $t_m^v$, 810c' $h_{n+2}^v$, 810c" $r_{i+i}^v$. In contrast to existing techniques, layered audio-video engine 328 employs m+1 multi-indexes: m visual indexes and one audio index. All the results refined by the m+1 multi-index are combined together in the second layer and the top N similar results are selected. The audio index reduces the number m for the visual index. In at least one implementation, the facility operates with one visual index.

Searching a LAVE Index

In various embodiments, the search process in LAVE indexing can be presented as follows. Let $P_a=\{l_1, l_2, \ldots, l_M\}$ represent the received audio query points and $P_v=\{v_1, v_2, \ldots, v_L\}$ represent the received visual query points. Through a search process, such as search process 630, LAVE search module 528 can return the top K visual points for each query visual point.

Step 1, for each audio point $l_m$ in $P_a$, LAVE search module 528 acquires the nearest approximate neighbors by a linear search in the audio index. Then LAVE search module 528 assigns the matching pairs to different candidate clusters $C=\{c_1, c_2, \ldots, c_N\}$. LAVE search module 528 assigns two pairs to the same cluster if their nearest approximate neighbors come from the same video.

Step 2 LAVE search module 528 reorders the clusters by temporal verification. For example, LAVE search module 528 can represent temporal distance by $\Delta t$ to denote the time difference of the two LBAFs in the matching pairs. The histogram of $\Delta t$ can be computed for all pairs in $c_n$ and the score of $c_n$ equals $h_n/M$, where $h_n$ represents the maximum value of the histogram. This score can also be used for similarity computation. Then the top K' candidate clusters are chosen. The buckets associated with the top K' candidate clusters in the second layer can be regarded as a subset.

Step 3, for each $v_i$ in $P_v$, the K LAVE search module 528 can obtain nearest approximate neighbors as follows: a) Top K approximate neighbors can be determined by linear search in the subset of the second layer. b) Use the multi-index indexing method to search other top K nearest neighbor points. c) The 2K nearest neighbor points can be reordered by similar distance, and the top K nearest points can be selected.

Step 4, LAVE search module 528 can return the top K nearest visual points as the search results.

In summary, according to the process, LAVE search module 528 combines the audio and visual information in two stages. The first stage is Step 1—Step 3.a. In this stage, mobile video search uses the higher compressed audio information as a coarse filter and the more discriminative visual information as the fine filter to improve the overall search speed. Furthermore, as the similarity is computed in separate layers, the combination stage can also preserve the individual structure of each signature. The second stage is Step 3.b—Step 4. In contrast to the first combination stage, which heavily depends on audio search accuracy, in the second stage, the combination of audio and visual information can be weighted by the hamming distance of visual hash bits. The two stages exploit the complementary nature of the audio and visual signals for robust mobile video search. Due to the m+1 multi-index, i.e., m visual indexes and one audio index, the computational complexity of searching the LAVE index can be based on the multi-index indexing method LAVE search module 528 uses to search the nearest visual neighbor points.

Geometric Verification

In various embodiments, geometric verification such as geometric verification 634 by geometric verification module 530 can be presented as follows. Geometric verification can use the top N points, with the Hough Transfer method to get similar source key frames of the query, and, a subsequent geometric verification (GV) 634 considering spatial consistency of local features can be used to reject false-positive matches. In order to reduce the time consumption of GV, geometric verification module 530 can employ a fast and effective GV based ranking step to find the most similar image. In at least one implementation, the method utilizes the orientation of descriptors, such that the location information of the local features need not be transmitted over the network. The method hypothesizes two matched descriptors of duplicate images should have the same orientation difference. So for two duplicate images, geometric verification module 530 calculates the orientation distance $\Delta\theta_d$ between each matched local feature pair. Then geometric verification module 530 quantizes all $\Delta\theta_d$ into C bins, e.g., C=10. Furthermore, geometric verification module 530 scans the histogram for a peak and sets the global orientation difference as the peak value. Geometric verification module 530 obtains the geometric verification score from the number of the pairs in the peak, which is normalized by the number of total pairs.

Progressive Query

In various embodiments, a progressive query process such as progressive query 640 is performed by progressive query module 532. In contrast to existing mobile video search systems, (i.e., search after achieving all the query data), a progressive query process as described herein can significantly reduce the query cost and improve users' search experience. Progressive query module 532 can advance to the next query and dynamically calculate retrieval results, for example after or in response to arrival of each query has. Search can cease when a stable result is achieved.

Algorithm 1 provides an example progressive query process for at least one embodiment.

---

ALGORITHM 1
Algorithm 1 Progressive Query Process

---

Input: a new query $q_{k+1}$,
Output: top K nearest videos
1: add $q_{k+1}$ to Q -continued ALGORITHM 1
Algorithm 1 Progressive Query Process 2: search $q_{k+1}$, get $R_{k+1}$
3: add $R_{k+1}$ to R
4: for each $s_{n,m}$ in $R_{k+1}$ do
5:   find the $G_i$ contains $s_{n,m}$
6:   add $q_{k+1} \to s_{n,m}$ to $E_i$
7: end for
8: call W = VideoSimilarScore(G)
9: return top K nearest videos
ProcedureVideoSimilarScore(G)
1: for each $G_i$ in G do
2:   if $|E_i|$ is changed then
3:     calculate the MSM $M_i$
4:     if $|M_i| > \alpha$ then
5:       update $W_i = Sim(Q,V_i,W_i^n,W_i^n)$
6:     end if
7:   end if
8: end for
9: return W In a layered audio-video system as described herein, the progressive query process can be implemented via a two-part graph transformation and matching algorithm. As shown in FIG. 6, for each matched query and source video, progressive query module 532 can use a two-part graph G={N,E} to represent the matching. In the two-part graph, a query node, 636, can be represented by $q_k \in Q$, and denotes the received query at time k, a source node, 638, can be represented by $s_{n,m} \in S$, and denotes the mth key frame in source video $V_n$. Let $R_k$ denote all the returned similar key frames $S_{n,m}$ of query $q_k$. There will be an edge $e_{k,m} \in E$ if $S_{n,m} \in R_k$. After each second of time searching, progressive query module 532 can update the two-part graph $G_i$ and then the similarity score of the matching can be progressively calculated through $G_i$.

Algorithm 1 illustrates one embodiment of particulars of the progressive query process. If a new query arrives, a new query node will be added, such as at 636. Then, the edges of the two-part graph will be updated according to the returned result. During progressive query 640, if the number of edges of the two-part graph does not change, a similarity score of the matched video will not change; otherwise, the similarity score of the matched video can be updated as follows: First of, progressive query module 532 can calculate Maximum Size Matching (MSM) $M_i$ of $G_i$. If $|M_i| > \alpha$, progressive query module 532 can calculate a similarity score $W_i$ according to equation 1.

$$W_i = Sim(Q, V_i, W_i^a, W_i^v) \quad (1)$$
$$= Sim_a(Q, V_i, W_i^a) + Sim_v(Q, V_i, W_i^v) + Sim_t(Q, V_i)$$

In equation 1, $Sim_a(Q, V_i, W_i^a)$ favors the audio content similarity, which can be computed according to equation 2.

$$Sim_a(Q, V_i, W_i^a) = \frac{\Sigma w_{k,i}^a}{|Q|} \quad (2)$$

In equation 2, $w_{k,i}^a$ represents the audio similarity between query $q_k$ and video $V_i$ and $|Q|$ represents the query length. $Sim_v(Q, V_i, W_i^v)$ indicates the visual similarity according to equation 3.

$$Sim_v(Q, V_i, W_i^v) = \frac{\Sigma w_{k,i}^v}{|Q|} \quad (3)$$

In equation 3, $w_{k,i}^v$ represents the visual similarity between query $q_k$ and video $V_i$, and $Sim_t(Q, V_i)$, shows temporal order similarity. This score assures that the matched video should have a similar temporal order. Given MSM $M_i$ of $G_k$, its temporal matching number can be calculated by, for example, a Longest Common Subsequence (LCSS). LCSS is a variation of the edit distance, which progressive query module 532 can use to denote the number of frame pairs of $M_k$ matched along the temporal order according to equation 4.

$$LCSS(i, j) = \begin{cases} 0 & i = 0 \text{ or } j = 0 \\ LCSS(i-1, j-1) + 1 & e_{i,j} > 0 \\ \max\{LCSS(i-1, j), LCSS(i, j-1)\} & e_{i,j} = 0 \end{cases} \quad (4)$$

Thus, $Sim_t(Q, V_i)$ can be obtained according to equation 5.

$$Sim_t(Q, V_i) = \frac{LCSS(|Q|, |V|)}{|Q|}. \quad (5)$$

After computing all the similarities between Q and V, progressive query module 532 can return the top K videos as the search results. In various embodiments, the computational complexity of the progressive query process 640 as described herein is $O(|G| \times |N_i| \times |E_i|)$, where $|G|$ represents the number of two-part graphs, and $|N_i|$ represents the number of vertices, while $|E_i|$ represents the number of edges in each two-part graph. However, in at least one implementation, the time consumed for the similarity calculation process is less than $O(|G| \times |N_i| \times |E_i|)$ because $|E_i|$ does not change in most two-part graphs.

Example Operation

Figure 9:
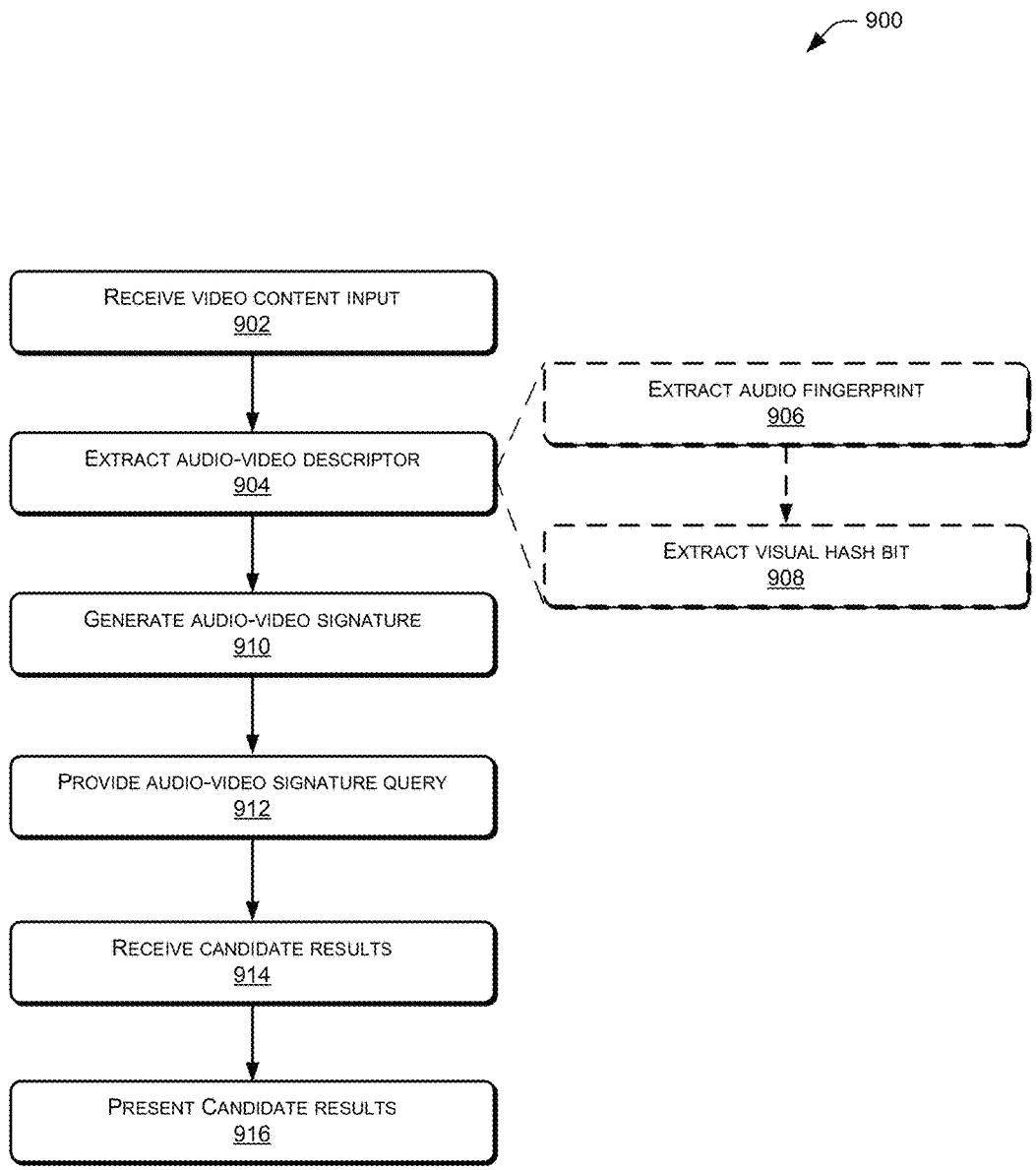
FIG. 9 is a flow diagram of an example process for implementing mobile video search on a client device.
Figure 10:
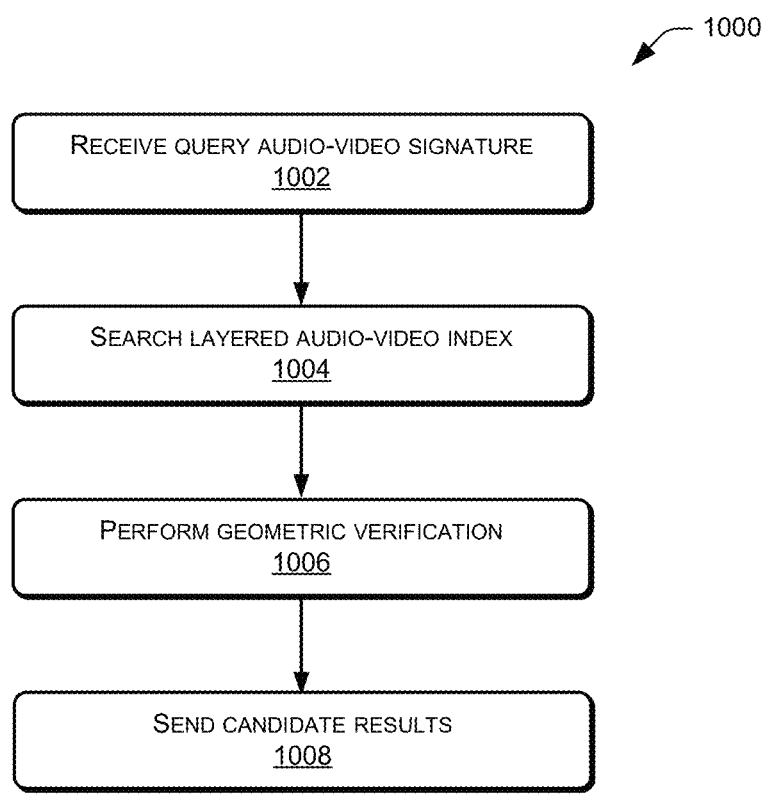
FIG. 10 is a flow diagram of an example process for implementing video search on a server using a layered audio-video index.
Figure 11:
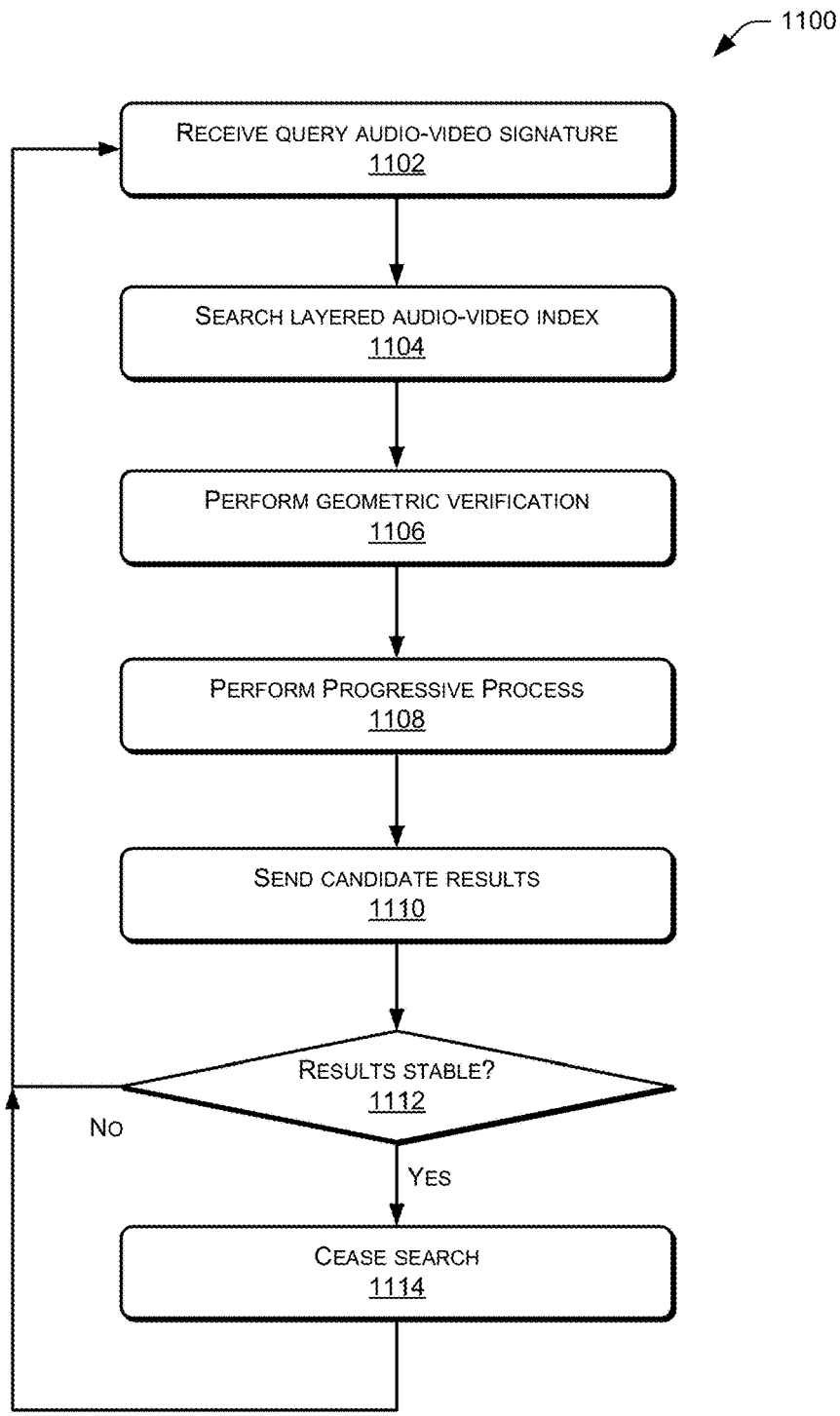
FIG. 11 is a flow diagram that illustrates an example implementation of progressive processing during video search on a server using a layered audio-video index.

FIGS. 9-11 illustrate example processes for implementing aspects of mobile video search of a LAVE indexed dataset as described herein. These processes are illustrated as collections of blocks in logical flow graphs, which represent a sequence of operations that can be implemented in hardware, software, or a combination thereof. In the context of software, the blocks represent computer-executable instructions on one or more computer-readable media that, when executed by one or more processors, cause the processors to perform the recited operations.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Note that the order in which the processes are described is not intended to be construed as a limitation, and any number of the described process blocks can be combined in any order to implement the processes, or alternate processes. Additionally, individual blocks may be deleted from the processes without departing from the spirit and scope of the subject matter described herein. Furthermore, while the processes are described with reference to the mobile device 304 and server 306 described above with reference to FIGS. 1-8, in some embodiments other computer architectures including other cloud-based architectures as described above may implement one or more portions of these processes, in whole or in part.

FIG. 9 illustrates an example process 900 for implementing a mobile video search tool on a client device such as device 304. Although process 900 is described as being performed on a client device, in some embodiments a system including a client device and a server, which may include multiple devices in a network-based or cloud configuration as described above, can perform aspects of process 900.

Aspects of a mobile video search tool as described herein can be implemented as a search application running on the mobile device and/or via an application programming interface (API) in some embodiments. The mobile video search tool can capture the video input for query and perform extraction of the audio fingerprint and visual hash bits to form the audio-video signature. In the case of an application running on the mobile device, the application can send the audio-video signature as the video search query. In the case of an API, the application can expose the audio fingerprint and visual hash bits making up the audio-video signature via an API for another application to use for video search. In that case, the application accessing the API for video search can send the audio-video signature as the video search query.

At block 902, a device such as device 304 configured to receive video content as input via a video search tool, such as mobile video search tool 316, receives video content as input. In various embodiments receiving video content as input includes one or more input devices or components such as a microphone 410 and/or a camera 408 associated with device 304 capturing audio input from the video content via the microphone and/or capturing visual input from the video content via the camera in time slices. In some embodiments receiving video content as input includes receiving audio input and/or visual input associated with the video content as exposed via an API. In several embodiments, the time slices of video content are received by input devices associated with the device from a video output device not associated with the device. In various embodiments, a length of individual ones of the time slices includes at least about 0.1 second and at most about 10.0 seconds. In at least one embodiment, each time slice can represent one second of video content.

At block 904, the device, such as device 304, configured to extract an audio-video descriptor for a time slice of the video content via an audio-video extractor, such as one or more of an audio extraction module 426 and/or a video extraction module 428, performs extraction including of an audio-video descriptor for a time slice of the video content. In various embodiments extracting audio-video descriptors for the time slices of video content includes obtaining aural and/or visual characteristics of the video content corresponding to the time slice.

In some embodiments, at block 906 the device, such as device 304, configured to extract aural characteristics for a time slice of the video content via an audio extraction module, such as audio extraction module 426, performs extraction including of an audio fingerprint of the video content corresponding to the time slice for use in generating an audio-video signature.

In some embodiments, at block 908 the device, such as device 304, configured to extract visual characteristics for a time slice of the video content via video extraction module, such as video extraction module 428, performs extraction including of at least one visual hash bit of the video content corresponding to the time slice for use in generating an audio-video signature.

At block 910, the device, such as device 304, configured to generate an audio-video signature via a signature generator, such as signature module 430, generates an audio-video signature associated with one or more of the time slices of video content based at least in part on the audio-video descriptor having been extracted. In several embodiments, the audio-video signature includes at least an audio fingerprint and a video hash bit associated with a time slice of video content. In various embodiments, generation of an audio-video signature on the device can be performed by an application, and the generated audio-video signature can be used by the application for search or provided from the application by an API. In some embodiments, generation of an audio-video signature on the device can include an API providing raw descriptor extractions from which another application, which can be on or off the device, can generate the audio-video signature.

At block 912, the device, such as device 304, configured to provide an audio-video signature via a signature module, such as signature module 430, provides an audio-video signature associated with one or more of the time slices of video content generated based at least in part on the audio-video descriptor having been extracted as a query. In various embodiments providing the audio-video signature includes sending the audio-video signature as a query toward a dataset. In various embodiments, the dataset includes a layered audio-video indexed dataset.

At block 914, the device, such as device 304, configured to receive candidate results responsive to the query via a results module, such as results module 432, receives candidate results responsive to the query. In various embodiments receiving the candidate results responsive to the query includes receiving the candidate results as a progressive listing of candidate results before reaching an end of the time slices of video content being received.

At block 916, the device, such as device 304, configured to present candidate results responsive to the query via a user interface module, such as user interface module 434, causes candidate results to be presented. In various embodiments presenting the candidate results includes presenting the candidate results in a user interface of the device before reaching an end of the time slices of video content being received. In some embodiments presenting the candidate results includes presenting updated candidate results in the user interface of the device before reaching an end of the time slices of video content being received. Such updated candidate results can represent progressive candidate results for a progressive candidate results listing.

FIG. 10 illustrates an example process 1000 for implementing video search on a server, such as server 306, using a layered audio-video index, such as LAVE index 516.

Although process 1000 is described as being performed on a server, in some embodiments a system including one or more servers, which may include multiple devices in a network-based or cloud configuration as described above and in some instances at least one client device, can perform process 1000.

At block 1002, a device such as server 306 configured to receive a query audio-video signature as input via a layered audio-video engine, such as layered audio-video engine 328, receives a query audio-video signature as input. In various embodiments the query audio-video signature is received as input for a layered audio-video search. In some embodiments the query audio-video signature is received as input for a layered audio-video search from a mobile device such as device 304.

At block 1004, a device such as server 306 configured to search a layered audio-video index to identify entries having a similarity to the query audio-video signature, such as LAVE search module 528, performs a search of a layered audio-video index associated with the layered audio-video engine to identify entries in the layered audio-video index having a similarity to the query audio-video signature. In various embodiments the search identifies entries having a similarity to the query audio-video signature above a threshold. In various non-exclusive instances the threshold can include a predetermined similarity threshold, a variable similarity threshold, a relative similarity threshold, and/or a similarity threshold determined in real time.

At block 1006, a device such as server 306 configured to perform geometric verification of the entries having a similarity to the query audio-video signature, such as geometric verification module 530, performs geometric verification of entries from the layered audio-video index having similarity to the query audio-video signature. In various embodiments performing geometric verification includes performing geometric verification of respective key frames from the query audio-video signature and entries from the layered audio-video index having the similarity.

At block 1008, a device such as server 306 configured to send candidate results, such as decision module 534, send candidate results which are similar to the query audio-video signature. In various embodiments sending candidate results identified via the geometric verification includes sending candidate results identified via the geometric verification toward the mobile device such as mobile device 304 from which the query audio-video signature was received.

FIG. 11 illustrates another example process 1100 for implementing video search on a server, such as server 306, using a layered audio-video index, such as LAVE index 516.

Although process 1100 is described as being performed on a server, in some embodiments a system including one or more servers, which may include multiple devices in a network-based or cloud configuration as described above and in some instances at least one client device, can perform process 1100.

At blocks 1102, 1104, and 1106, a device such as server 306 configured as described regarding process 1000, such as with layered audio-video engine 328, performs operations corresponding to blocks 1002, 1004, and 1006, respectively.

At block 1108, a device such as server 306 configured to perform progressive processing, such as progressive query module 532, processes candidate results identified via the geometric verification. In various embodiments processing candidate results identified via the geometric verification includes progressively processing entries having respective audio-video signatures. In some embodiments, progressively processing entries having respective audio-video signatures includes employing two-part graph-based transformation and matching.

At block 1110, a device such as server 306 configured to send candidate results, such as decision module 534, sends candidate results according to the progressive processing. In various embodiments sending candidate results according to the progressive processing includes sending candidate results according to the progressive processing toward the mobile device such as mobile device 304 from which the query audio-video signature was received. In some embodiments, sending candidate results according to the progressive processing includes sending candidate results in a configuration to indicate the candidate results have been updated and searching will continue such as 112. In some embodiments, sending candidate results according to the progressive processing also includes sending stabilized candidate results in a configuration to indicate the candidate results have not been updated and searching will be ceased such as 200.

At block 1112, a device such as server 306 configured to send candidate results, such as decision module 534, determines whether the candidate results from the progressive processing are stable. In various embodiments determining whether the candidate results from the progressive processing are stable includes determining whether to update the candidate results based at least in part on whether the candidate results are maintained. In some embodiments, determining whether the candidate results from the progressive processing are stable includes, determining whether the candidate results are stable for a period of time. In some embodiments, the period of time is measured in seconds. In some embodiments, the period of time is two seconds. In some embodiments, the period of time is three seconds. In some embodiments, the period of time is variable and/or relative to the number of times the progressive query process has been performed without ceasing the search.

In some embodiments, responsive to the candidate results being determined to be stable at block 1112, at block 1114, a device such as server 306 configured to end querying, such as decision module 534, ceases searching corresponding to the audio-video content. In various embodiments when the candidate results are determined to be stable for a period of time at block 1112, includes ceasing the receiving, searching, performing, and processing corresponding to the audio-video content. In some embodiments, ceasing searching at block 1114 can include sending candidate results according to the progressive processing in a configuration to indicate the candidate results have not been updated and searching is being ceased such as in the user interface of 200.

In some embodiments, responsive to the candidate results being determined not to be stable at block 1112, a device such as server 306 configured to end querying, such as decision module 534, continues searching. In various embodiments when the candidate results are determined not to be stable for a period of time at block 1112, includes continuing searching by returning flow to block 1102, which can include repeating the receiving, searching, performing, and processing corresponding to the audio-video content. In some embodiments, continuing searching by returning flow to block 1102 can include sending candidate results according to the progressive processing in a configuration to indicate whether the candidate results have been updated such as in the user interface of 200.

Additional Examples of Embodiments

Embodiment A includes a method comprising: accessing a video dataset; performing audio-video descriptor extraction on respective videos from the video dataset; generating a series of audio-video signatures associated with time slices of the respective videos; and building a layered audio-video index in which the entries include the series of audio-video signatures.

Embodiment B includes a method comprising: extracting audio-video descriptors corresponding to individual videos in a video dataset; acquiring an audio index, the audio index including audio fingerprints from the audio-video descriptors; acquiring a visual index, the visual index including visual hash bits from the audio-video descriptors; creating a first layer including a multi-index by associating the audio index and at least a part of the visual index; creating a second layer including the visual index; and maintaining a time relationship between the multi-index of the first layer and the visual index of the second layer.

Embodiment C includes a method as described regarding embodiments A and/or B, wherein the at least a part of a visual index for creating a first layer includes a random selection of hash bits from a second layer.

Embodiment D includes a method as described regarding embodiments A, B, and/or C, further comprising refining a number of visual points to be searched in a second layer via an audio index.

Embodiment E includes a method comprising: receiving a query audio-video signature related to video content at a layered audio-video engine; searching a layered audio-video index associated with the layered audio-video engine to identify entries in the layered audio-video index having a similarity to the query audio-video signature above a threshold; performing geometric verification of respective key frames from the query audio-video signature and entries from the layered audio-video index having the similarity; and sending candidate results identified via the geometric verification.

Embodiment F includes a method comprising: receiving a query audio-video signature related to video content at a layered audio-video engine; searching a layered audio-video index associated with the layered audio-video engine to identify entries in the layered audio-video index having a similarity to the query audio-video signature above a threshold; performing geometric verification of respective key frames from the query audio-video signature and entries from the layered audio-video index having the similarity; progressively processing entries having respective audio-video signatures; determining whether the candidate results are stable; and determining whether to update the candidate results based at least in part on whether the candidate results are maintained; sending candidate results identified in accordance with whether the candidate results are maintained; in an event the candidate results are not maintained for a predetermined period of time, repeating the receiving, searching, performing, and processing corresponding to the audio-video content; and in an event the candidate results are maintained for a predetermined period of time, ceasing the receiving, searching, performing, and processing corresponding to the audio-video content.

CONCLUSION

With the ever-increasing functionality and data access available through mobile devices, such devices can serve as personal Internet-surfing concierges that provide users with access to ever increasing amounts of data while on the go. By leveraging the computing resources made available by a mobile device as described herein, a mobile video search tool can effectively perform a video search without sending a clip of the video itself as the query.

Although a mobile video search system has been described in language specific to structural features and/or methodological operations, it is to be understood that the features and operations defined in the appended claims is not necessarily limited to the specific features or operations described. Rather, the specific features and operations are disclosed as example forms of implementing the claims.

What is claimed is:

1. A method comprising:
receiving, via an input component of a computing device, a plurality of time slices of video content;
reduce a scale of video of respective time slices of the plurality of time slices of video content to generate respective small pictures for the respective time slices, wherein the small pictures are reduced scale versions of images collected from a video segment corresponding with a time slice of the plurality of time slices of video content;
extracting audio-video descriptors for the respective time slices, to obtain aural and visual characteristics of video content corresponding to the respective time slices, wherein the visual characteristics include hashed features extracted from the respective small pictures, and wherein the aural characteristics include a compressed fingerprint for audio content corresponding to the respective time slices;
generating an audio-video signature associated with the respective time slices based at least in part on the audio-video descriptors for the respective time slices;
providing the audio-video signature associated with one or more of the respective time slices of the plurality of time slices as a query toward a dataset;
receiving candidate results of the query before reaching an end of the one or more of the respective time slices of the plurality of time slices of the video content, wherein the candidate results are updated upon the query of the dataset using each of the one or more of the respective time slices of the plurality of time slices, and wherein the query of the dataset ceases after the lapse of a time window allowed for the query; and
presenting at least some of the candidate results before reaching the end of the one or more of the respective time slices of the plurality of time slices of the video content.

2. A method as recited in claim 1, wherein the plurality of time slices of video content are received from a video output device not associated with the computing device.

3. A method as recited in claim 1, wherein audio-video of the respective time slices of the plurality of time slices of video content are received directly or indirectly by at least one of a camera input device or a microphone input device associated with the computing device.

4. A method as recited in claim 3, wherein the plurality of time slices of video content are received from a video output device not associated with the computing device.

5. A method as recited in claim 1, wherein a length of individual ones of the plurality of time slices includes at least about 0.1 second and at most about 10.0 seconds.

6. A method as recited in claim 1, wherein the dataset includes a layered audio-video indexed dataset.

7. A method as recited in claim 1, wherein the audio-video signature includes an audio fingerprint and a video hash bit associated with the respective time slices of the plurality of time slices of video content.

8. A system comprising at least one processor and a memory including instructions configured to perform a method as recited in claim 1.

9. A computer-readable storage medium having computer-executable instructions encoded thereon, the computer-executable instructions configured to, upon execution, program a device to perform a method as recited in claim 1.

10. A mobile device configured to perform a method as recited in claim 1.

11. A method of layered audio-video search comprising:
   receiving a query audio-video signature related to video content at a layered audio-video engine, wherein the query audio-video signature was generated at least in part using a small picture created by reducing a scale of video content associated with the audio-video signature, wherein the small picture is a reduced scale version of an image collected from a video segment corresponding with the query audio-video signature, and wherein the query audio-video signature includes hashed features extracted from the small picture and a compressed fingerprint for audio content corresponding to the query audio-video signature;
   searching a layered audio-video index associated with the layered audio-video engine to identify entries in the layered audio-video index having a similarity to the query audio-video signature above a threshold;
   performing geometric verification of respective key frames from the query audio-video signature and entries from the layered audio-video index having the similarity; and
   sending candidate results identified via the geometric verification, wherein the candidate results are updated upon the performing of the geometric verification of each respective key frame of the respective key frames from the query audio-video signature and the entries from the layered audio-video index having the similarity, and wherein the performing of the geometric verification of each respective key frame of the respective key frames from the query audio-video signature and the entries from the layered audio-video index having the similarity ceases after the lapse of a time window allowed for a query using the query audio-video signature.

12. A method as recited in claim 11, further comprising progressively processing entries having respective audio-video signatures.

13. A method as recited in claim 12, wherein the progressively processing the entries having respective audio-video signatures includes employing two-part graph-based transformation and matching.

14. A method as recited in claim 11, further comprising:
   determining whether the candidate results are stable; and
   determining whether to update the candidate results based at least in part on whether the candidate results are maintained.

15. A computer-readable storage medium having computer-executable instructions encoded thereon, the computer-executable instructions configured to, upon execution, program a device to perform operations as recited in claim 11.

16. A system comprising at least one processor and memory including instructions configured to perform a method as recited in claim 11.

17. A computing device configured to perform a method as recited in claim 11.

18. A method of building a layered audio-video index comprising:
   extracting audio-video descriptors corresponding to individual videos in a video dataset;
   acquiring an audio index, the audio index including audio fingerprints from the audio-video descriptors, wherein the fingerprints are compressed and derived from landmarks in the audio;
   acquiring a visual index, the visual index including visual hash bits from the audio-video descriptors, wherein the visual hash bits are extracted from a small picture created by reduction of the scale of individual videos, wherein the small picture is a reduced scale version of an image collected from a video segment corresponding to the audio-video descriptors;
   creating a first layer including a multi-index by associating the audio index and at least a part of the visual index;
   creating a second layer including the visual index; and
   maintaining a time relationship between the multi-index of the first layer and the visual index of the second layer, wherein the extracting of the audio-video descriptors ceases after the lapse of a time window allowed for completing a query against a dataset using the multi-index.

19. A method as claim 18 recites, wherein the at least a part of the visual index for creating the first layer includes a random selection of hash bits from the second layer.

20. A method as claim 18 recites, further comprising refining the number of visual points to be searched in the second layer via the audio index.

* * * * *